(12) United States Patent
Choi et al.

(10) Patent No.: US 10,296,877 B2
(45) Date of Patent: May 21, 2019

(54) METHOD AND APPARATUS FOR PROVIDING A GIFT USING A MOBILE COMMUNICATION NETWORK AND SYSTEM INCLUDING THE APPARATUS

(71) Applicant: Eleven Street Co., Ltd., Seoul (KR)

(72) Inventors: Kyung-Lim Choi, Uiwang-si (KR); Jae-Hee Cho, Goyang-si (KR); Hyo-Jung Joo, Seoul (KR)

(73) Assignee: ELEVEN STREET CO., LTD., Seoul (KR)

( * ) Notice: Subject to any disclaimer, the term of this patent is extended or adjusted under 35 U.S.C. 154(b) by 366 days.

(21) Appl. No.: 14/755,882

(22) Filed: Jun. 30, 2015

(65) Prior Publication Data

US 2015/0302513 A1    Oct. 22, 2015

Related U.S. Application Data

(63) Continuation of application No. 12/161,303, filed as application No. PCT/KR2007/001155 on Mar. 8, 2007, now Pat. No. 9,390,408.

(30) Foreign Application Priority Data

| Dec. 1, 2006 | (KR) | .................. | 10-2006-0120678 |
| Dec. 1, 2006 | (KR) | .................. | 10-2006-0120684 |
| Dec. 1, 2006 | (KR) | .................. | 10-2006-0120688 |

(51) Int. Cl.
*G06Q 30/06* (2012.01)
*G06Q 20/12* (2012.01)
(Continued)

(52) U.S. Cl.
CPC .......... *G06Q 20/123* (2013.01); *G06Q 20/12* (2013.01); *G06Q 20/127* (2013.01);
(Continued)

(58) Field of Classification Search
CPC ...... G06Q 20/202; G06Q 20/20; G06Q 30/06; G06Q 30/02; G06Q 30/0641; G06Q 30/0601
(Continued)

(56) References Cited

U.S. PATENT DOCUMENTS

| 5,781,189 A | 7/1998 | Holleran et al. |
| 5,822,123 A | 10/1998 | Davis et al. |

(Continued)

FOREIGN PATENT DOCUMENTS

| JP | 2000215234 | 8/2000 |
| JP | 2001188856 | 7/2001 |

(Continued)

OTHER PUBLICATIONS

Official Journal EPO; "Notice from the European Patent Office dated Oct. 1, 2007 concerning business methods"; pp. 592-593.
(Continued)

*Primary Examiner* — Andrew Joseph Rudy
(74) *Attorney, Agent, or Firm* — Brinks Gilson & Lione

(57) ABSTRACT

The present disclosure provides a method of providing a gift icon using a communication network. The method includes: providing, by a gift provision apparatus, information about products to a user terminal connected with the gift provision apparatus through the communication network; selecting, by the user terminal, at least one of the products; and inputting, by the user terminal, information of a receipt terminal to receive the at least one selected product, wherein the receipt terminal is separated from the user terminal; transmitting, by the user terminal, a request message for a gift to the gift provision apparatus; and providing, by the gift provision apparatus, the gift icon to the receipt terminal through the communication network, when the gift provision apparatus receives the request message, wherein the gift icon com-
(Continued)

prises a plurality of images and corresponds to the at least one selected product.

19 Claims, 33 Drawing Sheets

(51) Int. Cl.
   *G06Q 30/02* (2012.01)
   *G06Q 20/20* (2012.01)
   *G06Q 20/40* (2012.01)
   *H04L 29/08* (2006.01)
   *G06Q 20/32* (2012.01)

(52) U.S. Cl.
   CPC ......... *G06Q 20/202* (2013.01); *G06Q 20/322* (2013.01); *G06Q 20/325* (2013.01); *G06Q 20/40* (2013.01); *G06Q 30/02* (2013.01); *G06Q 30/06* (2013.01); *G06Q 30/0601* (2013.01); *G06Q 30/0603* (2013.01); *G06Q 30/0609* (2013.01); *G06Q 30/0633* (2013.01); *G06Q 30/0635* (2013.01); *G06Q 30/0637* (2013.01); *G06Q 30/0641* (2013.01); *G06Q 30/0643* (2013.01); *H04L 67/02* (2013.01); *H04L 67/1095* (2013.01)

(58) Field of Classification Search
   USPC .......................................... 705/21, 26.1, 27.2
   See application file for complete search history.

(56) References Cited

U.S. PATENT DOCUMENTS

| | | | |
|---|---|---|---|
| 5,940,073 A * | 8/1999 | Klosterman | H04N 5/44543 348/E5.104 |
| 6,240,397 B1 * | 5/2001 | Sachs | G06Q 30/02 705/14.14 |
| 6,321,211 B1 | 11/2001 | Dodd | |
| 6,357,043 B1 | 3/2002 | Ellis et al. | |
| 6,453,281 B1 * | 9/2002 | Walters | G06F 3/0481 704/200 |
| 6,484,149 B1 * | 11/2002 | Jammes | G06F 17/3089 705/26.62 |
| 6,633,849 B1 * | 10/2003 | Dodd | G06Q 30/02 705/26.35 |
| 6,668,054 B1 | 12/2003 | Contino et al. | |
| 6,771,317 B2 | 8/2004 | Ellis et al. | |
| 6,792,603 B2 | 9/2004 | Aizono et al. | |
| 6,796,491 B2 | 9/2004 | Nakajima | |
| 6,886,036 B1 * | 4/2005 | Santamaki | G06F 17/30067 707/999.003 |
| 7,006,993 B1 * | 2/2006 | Cheong | G06Q 20/02 705/35 |
| 7,013,232 B2 * | 3/2006 | Fuller, III | G06F 9/44505 702/119 |
| 7,047,547 B2 | 5/2006 | Alten et al. | |
| 7,076,453 B2 | 7/2006 | Jammes et al. | |
| 7,149,710 B1 | 12/2006 | Edmark | |
| 7,195,157 B2 | 3/2007 | Swartz et al. | |
| 7,233,913 B2 | 6/2007 | Scroggie et al. | |
| 7,266,533 B2 * | 9/2007 | Karas | G06Q 20/02 705/26.35 |
| 7,269,837 B1 * | 9/2007 | Redling | G06Q 30/02 348/E5.006 |
| 7,270,263 B2 * | 9/2007 | Rosenblatt | G06Q 20/10 235/379 |
| 7,299,201 B2 | 11/2007 | Jammes et al. | |
| 7,305,355 B2 * | 12/2007 | Tarvydas | G06Q 30/06 705/26.43 |
| 7,305,427 B2 * | 12/2007 | Kaye | G06Q 30/06 705/26.35 |
| 7,318,047 B1 * | 1/2008 | Foth | G06Q 20/02 705/26.4 |
| 7,346,543 B1 | 4/2008 | Edmark | |
| 7,376,613 B1 | 5/2008 | Cofino et al. | |
| 7,379,901 B1 * | 5/2008 | Philyaw | G06Q 20/10 705/17 |
| 7,430,524 B2 * | 9/2008 | Shah | G06F 9/44505 705/26.8 |
| 7,444,394 B2 * | 10/2008 | Igarashi | H04L 29/12009 709/223 |
| 7,499,769 B2 * | 3/2009 | Walker | G06Q 10/06 700/236 |
| 7,548,888 B2 * | 6/2009 | Schutz | G06Q 20/04 705/39 |
| 7,561,299 B2 * | 7/2009 | Elarde | B42D 5/04 358/1.18 |
| 7,603,292 B1 * | 10/2009 | Bragg | G06Q 30/02 705/26.35 |
| 7,606,738 B2 * | 10/2009 | Storch | G06Q 20/102 235/375 |
| 7,657,281 B2 | 2/2010 | Eibye | |
| 7,668,782 B1 * | 2/2010 | Reistad | G06Q 30/06 705/50 |
| 7,685,236 B1 | 3/2010 | Harik et al. | |
| 7,725,356 B2 | 5/2010 | Shah et al. | |
| 7,792,709 B1 | 9/2010 | Trandal et al. | |
| 7,797,431 B2 | 9/2010 | Franklin et al. | |
| 7,814,213 B2 | 10/2010 | Franklin et al. | |
| 7,827,068 B2 | 11/2010 | Shah et al. | |
| 7,828,656 B2 * | 11/2010 | Paulsen | G07F 17/32 463/29 |
| 7,831,719 B2 | 11/2010 | Franklin et al. | |
| 7,855,805 B2 * | 12/2010 | Silverbrook | B41J 3/445 235/375 |
| 7,870,587 B2 | 1/2011 | Ellis et al. | |
| 7,877,295 B2 * | 1/2011 | Mengerink | G06Q 30/0613 705/26.8 |
| 7,904,187 B2 | 3/2011 | Hoffberg et al. | |
| 7,953,629 B2 | 5/2011 | Kohda et al. | |
| 7,953,802 B2 | 5/2011 | Mousseau et al. | |
| 7,970,657 B2 | 6/2011 | Morgenstern | |
| 8,019,818 B2 | 9/2011 | Lorch et al. | |
| 8,033,704 B2 | 10/2011 | Krupa et al. | |
| 8,056,802 B2 | 11/2011 | Gressel et al. | |
| 8,224,702 B2 | 7/2012 | Mengerink et al. | |
| 8,234,128 B2 | 7/2012 | Martucci et al. | |
| 8,438,069 B2 * | 5/2013 | Chong | G06Q 30/0643 705/26.1 |
| 8,494,920 B2 * | 7/2013 | Greaves | G06Q 30/02 705/26.1 |
| 8,545,324 B2 * | 10/2013 | Murase | A63F 13/12 463/10 |
| 8,549,411 B2 | 10/2013 | Hoyle | |
| 8,571,980 B1 * | 10/2013 | Greenwood | G06Q 40/02 705/39 |
| 8,701,177 B2 | 4/2014 | Anderson et al. | |
| 8,755,273 B2 * | 6/2014 | Calvanese Strinati | H04L 5/006 370/230 |
| 8,775,273 B2 * | 7/2014 | Mengerink | G06Q 30/0635 705/26.1 |
| 8,904,414 B2 * | 12/2014 | Ku | H04N 7/17327 725/1 |
| 9,292,273 B2 * | 3/2016 | Cheng | G06F 8/62 |
| 9,390,408 B2 * | 7/2016 | Choi | G06Q 30/02 |
| 9,740,905 B2 * | 8/2017 | Yeakley | G06K 7/10881 |
| 9,811,728 B2 * | 11/2017 | King | G06K 9/00483 |
| 2001/0051896 A1 | 12/2001 | Noh et al. | |
| 2004/0049420 A1 * | 3/2004 | Carlson | G06Q 30/02 705/14.1 |
| 2004/0254855 A1 | 12/2004 | Shah | |
| 2005/0033780 A1 | 2/2005 | Simelius et al. | |
| 2005/0171940 A1 * | 8/2005 | Fogg | G06F 17/30554 |

FOREIGN PATENT DOCUMENTS

| | | |
|---|---|---|
| JP | 2001216398 | 8/2001 |
| JP | 2002157521 | 5/2002 |
| JP | 2002189873 | 7/2002 |

(56) References Cited

FOREIGN PATENT DOCUMENTS

| | | |
|---|---|---|
| JP | 2002215527 | 8/2002 |
| JP | 2002245280 | 8/2002 |
| JP | 2003122376 | 4/2003 |
| JP | 2003187151 | 7/2003 |
| JP | 2004295298 | 10/2004 |
| KR | 1020010097750 A | 11/2001 |
| KR | 1020020027027 A | 4/2002 |
| KR | 1020040103128 A | 12/2004 |
| KR | 1020050017688 A | 2/2005 |
| WO | 0103410 | 1/2001 |

OTHER PUBLICATIONS

Supplementary European Search Report for 07715555 dated Sep. 30, 2011.
Japanese Office Action for 2009-539167 dated Dec. 27, 2011.

\* cited by examiner

Fig. 9

| | |
|---|---|
| Gifticon transmission | |
| Product image | * product name: triangular roll<br>* price: 700 Won<br>* exchange place: GS25 |

| | |
|---|---|
| Caller number | 010-111-zzzz |
| product name | triangular roll |
| price | 700 Won |
| service usage | 0 Won |
| Title of SMS | 000 sends a gifticon |
| Message<br>0/40byte | |

| recipient number | | Quantity | |
|---|---|---|---|
| 010-aaa-bbbb | x | 1 | V |
| | x | 1 | V |
| | x | 1 | V |
| | x | 1 | V |
| | x | 1 | V |

- Please input numbers (16 digits) of discount coupon (without -) if there is discount coupon

| discount coupon | | use it |
|---|---|---|
| product price | discounted price | Subtotal price |
| 700 Won | -0 Won | 700 Won |

* selection of settlement method
- Phone-bill is not permitted for corporate name-mobile phone
- Information usage fee is available only for SK customers
- Settlement using a credit card is permitted from 1300 Won ◉ mixed  ○ credit card
○ information usage fee (only for SK customer)

* You are subjected to criminal charge when you use others' information

| Total settlement price | 700 Won |
|---|---|
| mobile phone number | 010 v - ☐ - ☐ |
| mobile communication provider | ◉ SKT  ○ KTF  ○ LGT |
| Social Security Number | 801234 - ☐ |

Checkout  cancel

Internet

Fig. 14

| Gifticon transmission | |
|---|---|
| Recipient | XXX-XXX-XXXXX |
| product name | triangular roll |
| product price | 700 Won |
| Quantity | 1                                    V |
| service usage fee | 0 Won |
| Title of SMS | 0000000000 sends a gifticon |
| Message | |

0/100byte

- Please input numbers (16 digits) of discount coupon (without -) if there is discount coupon

| discount coupon | | use it |
|---|---|---|
| product price | discounted | total settlement price |
| 700 Won | -0 Won | 700 Won |

* Selection of settlement method
  - Phone-bill is not permitted for corporate name-mobile phone
  - Information usage fee is available only for SKT customers
  - Settlement using a credit card is permitted from 1000 Won ○ Phone-bill    ○ Credit card    ○ Information usage fee(only for SKT customers)

Checkout    cancel

○ internet

Fig. 15

| Gifticon transmission | | | | |
|---|---|---|---|---|
| Recipient | | | Quantity | |
| 0101234aaaa | | X | 1 | V |
| 0114444bbob | | X | 1 | V |
| 017333cccc | | X | 1 | V |
| 0108888dddd | | X | 1 | V |
| 0106666eeee | | X | 1 | V |

| | |
|---|---|
| product name | triangular roll |
| product price | 700 Won |
| service usage fee | 0 Won |
| Title of SMS | 0000000000 sends a gifticon |
| Message | |

0/100byte

- Please input numbers (16 digits) of discount coupon (without -) if there is discount coupon

| discount coupon | | use it |
|---|---|---|

| product price | discounted | total settlement price |
|---|---|---|
| 3,500 Won | -0 Won | 3,500 Won |

* Selection of settlement method
  - Phone-bill is not permitted for corporate name-mobile phone
  - Information usage fee is available only for SKT customers
  - Settlement using a credit card is permitted from 1000 Won ○ Phone-bill   ○ Credit card   ○ Information usage fee(only for SKT customers)

| Checkout | cancel |
|---|---|

○ internet

Starbucks Mocha coffee product img.

☐ product name : Starbucks Mocha coffee
☐ product price : 2800 Won
☐ service usage fee : 0 Won
☐ exchange place : GS25

1> make a gift
2> See other popular products

[communication fee/1KB] 13 Won/data communication fee is free or is discounted to 60% upon subscription to a fixed charge system.

2710 make a gift

Please, input telephone number of recipient. transmission up to maximum 5 persons is possible (transmission to 010/011/017/016/018/019 is possible)
△ search address book
△ telephone number (input without "-")
010aaabbbb △ select quantity
  1    V
△ SMS message
000000 sends a gifticon.
(KTF/LGT customers may not receive full text of a message)
△ message (100 Byte)

1> OK
2> cancel

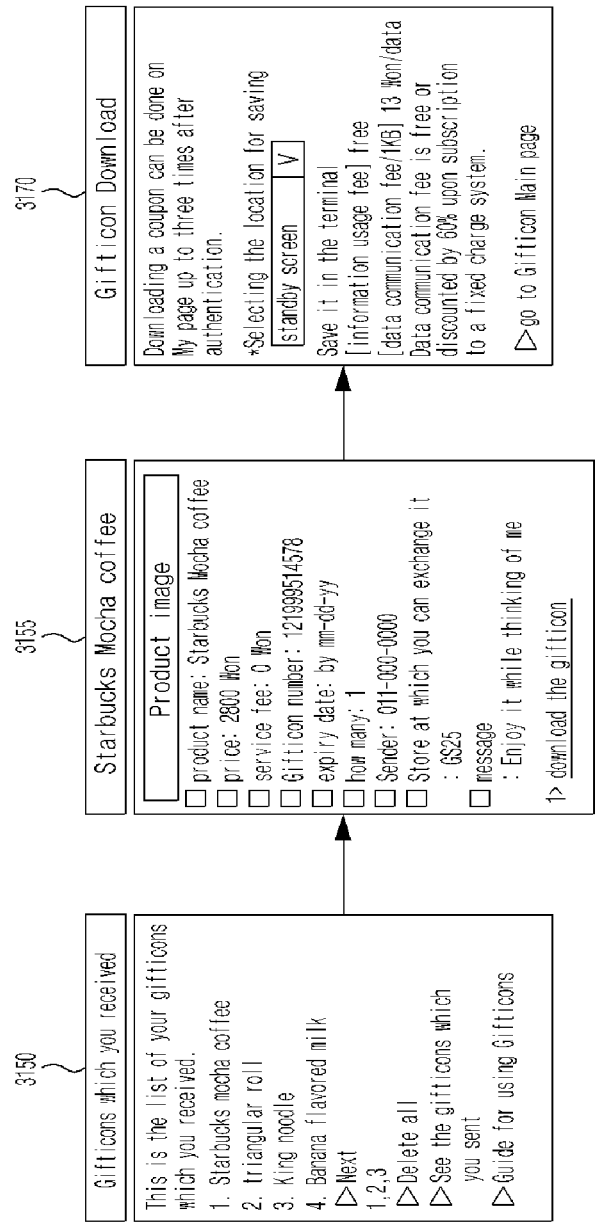

METHOD AND APPARATUS FOR PROVIDING A GIFT USING A MOBILE COMMUNICATION NETWORK AND SYSTEM INCLUDING THE APPARATUS

CROSS-REFERENCE TO RELATED APPLICATION

This application is a continuation application of U.S. patent application Ser. No. 12/161,303 filed Jul. 17, 2008, which is the national phase entry of international Application No. PCT/KR07/01155, filed Mar. 8, 2007, which is based upon and claims the benefits of priorities under 35 U.S.C § 119(a) of Patent Application No. 10-2006-0120688, filed on Dec. 1, 2006, Patent Application No. 10-2006-0120678, filed on Dec. 1, 2006 and Patent Application No. 10-2006-0120684, filed on Dec. 1, 2006 in Korea, the entire contents of which are incorporated herein by reference. In addition, this non-provisional application claims priorities in countries, other than the U.S., with the same reason based on the Korean Patent Applications, the entire contents of which are hereby incorporated by reference.

TECHNICAL FIELD

The present disclosure relates generally to a method of providing a gift using a communication network and, more particularly, to a method and apparatus for providing a gift icon using a communication network, which transmit and receive the gift icon in a lump or selectively using the communication network and an address book and a system including the apparatus.

BACKGROUND

Generally, a person, such as an insurance canvasser or a salesman, or a company which must continuously manage a number of customers provides a gift at appropriate intervals in order to maintain friendship or connectedness with a number of customers.

In order to provide a small gift to respective customers, whether the customers' addresses are changed must be determined and, if the change of addresses has not been determined in time, and then a gift is delivered, the gift is sent back, so that there is a problem in that an unnecessary shipping charge must be paid.

Furthermore, when a gift is transmitted through the Internet, and there are a number of recipients which will receive the gift, it is necessary to repeatedly write the postal codes and telephone numbers of the sender or recipients and delivery method, and a database for recording who received a gift, when the gift was provided, which gift was provided, is not prepared, so that, when information about this is required, there is a problem in that much time and effort are required.

SUMMARY

In some embodiments, a method of providing a gift icon using a communication network includes at least: providing, by a gift provision apparatus, information about products to a user terminal connected with the gift provision apparatus through the communication network; selecting, by the user terminal, at least one of the products, and inputting, by the user terminal, information of a receipt terminal to receive the at least one selected product, wherein the receipt terminal is separated from the user terminal; transmitting, by the user terminal, a request message for a gift to the gift provision apparatus; and providing, by the gift provision apparatus, the gift icon to the receipt terminal through the communication network, when the gift provision apparatus receives the request message, wherein the gift icon comprises a plurality of images and corresponds to the at least one selected product.

DESCRIPTION OF DRAWINGS

The above and other objects, features and advantages of the present disclosure will be more clearly understood from the following detailed description taken in conjunction with the accompanying drawings, in which:

FIGS. 5 to 10 are diagrams illustrating examples of a web or a wap page according to embodiments of the present disclosure;

Figure 20:
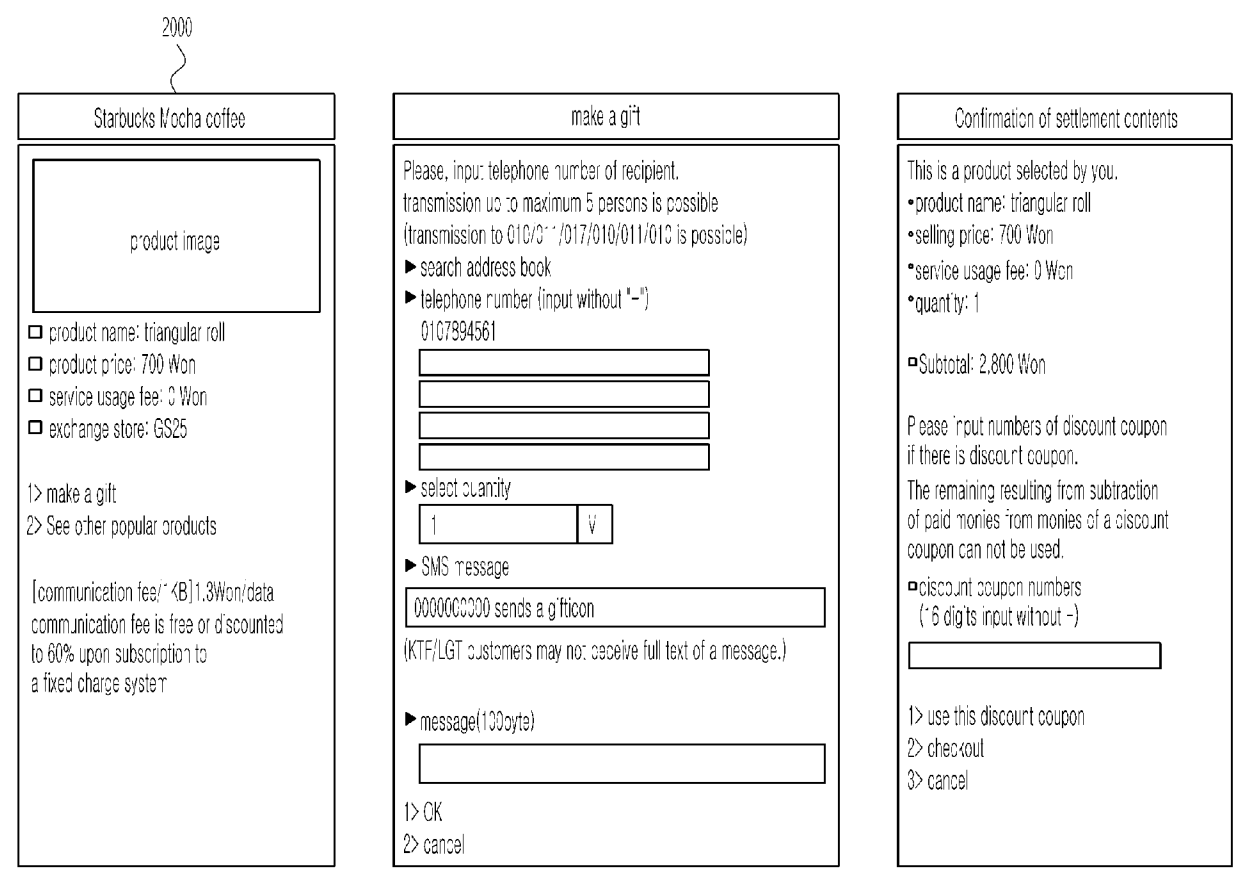

FIGS. 13 to 20 are diagrams illustrating a web or a wap page for illustration of the method of transmitting and receiving a gift icon using a mobile terminal according to a sixth embodiment of the present disclosure;

FIGS. 24 to 33 are diagrams illustrating a wap page for illustration of the method of providing a gift icon using a mobile terminal according to embodiments of the present disclosure.

DETAILED DESCRIPTION

Figure 1:
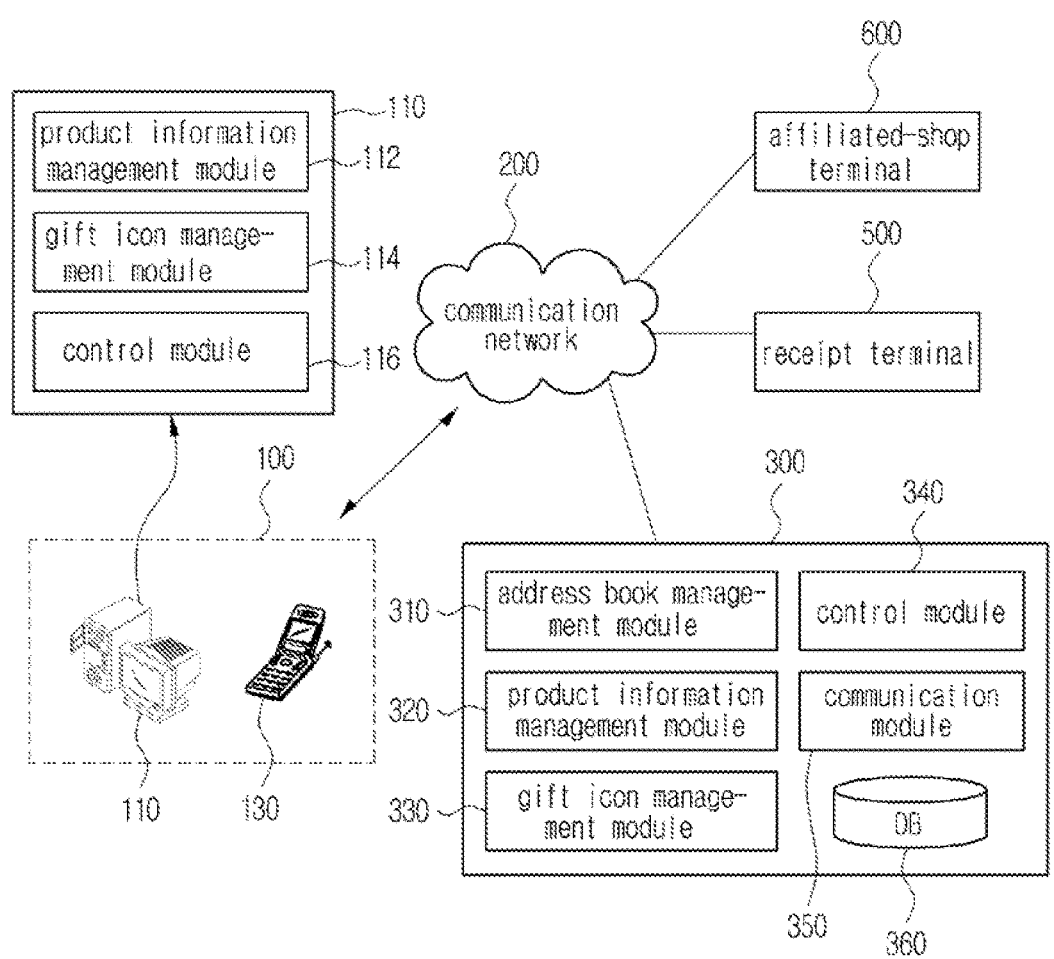
FIG. 1 is a diagram illustrating a system for providing a gift using a communication network according to an embodiment of the present disclosure.

Reference now should be made to the drawings, in which the same reference numerals are used throughout the different drawings to designate the same or similar components.

Preferred embodiments of the present disclosure are described below with reference to the accompanying drawings.

The present disclosure has been made keeping in mind the above problems occurring in the prior art, and an object of the present disclosure is to provide a method and apparatus for providing a gift using a communication network which are in conjunction with an address book, and provide a gift to the entire address book, at least one group of the address book, or at least one address individually selected from the address book and a system including the apparatus.

In order to accomplish the above object, another object of the present disclosure is to provide a method and apparatus for transmitting and receiving a gift using a messenger which provides or asks for a gift icon to or from a counterpart terminal connected through the messenger in real time.

In order to accomplish the above object, still another object of the present disclosure is to provide a method, apparatus and system for providing a gift using a mobile terminal which provide a gift icon corresponding to the product to a plurality of receipt terminals through the mobile terminal in a lump.

As described above, according to the method and apparatus for providing a gift using a communication network and the system including the apparatus of the present disclosure, an insurance canvasser, a Financial Consultant or a financial manager which must continuously manage a number of customers send gifts in a lump using an address book, so that there in an advantage in that time and effort required to provide gifts are dramatically reduced.

For products provided in a gift provision service as well as for low-price products the price of which is lower than a charge for delivery, or a charge for delivery of which is a burden, it is advantageous to provide or ask for gifts in real time, thereby activating business on the Internet.

The present disclosure are advantageous to transmit gift icons corresponding to the products to a plurality of terminal in a lump through a mobile terminal, and to easily provide the telephone numbers and e-mail information of the plurality of receipt terminals using an address book registered in a gift provision apparatus or stored in the memory of the mobile terminal without individually inputting the telephone numbers or e-mails by a user.

Furthermore, the present disclosure provides a function of providing a gift icon for return when a gift icon is received, thereby improving convenience of users and activating transaction of products through gift icons.

Furthermore, the gift provision apparatus manages the usable period, download, and use of the gift icon, thereby prohibiting the gift icon from being used again, and it is possible to acquire a particular product by requesting settlement for a particular gift for a counterpart terminal regardless of financial ability.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

FIG. 1 is a diagram illustrating a system for providing a gift using a communication network according to an embodiment of the present disclosure.

The gift provision system includes a user terminal 100, a gift provision apparatus 300, a receipt terminal 500, an affiliated shop terminal 600 and a settlement server 700.

The user terminal 100 includes a wired terminal 110 and a mobile terminal 130, is in conjunction with an address book stored in the memory of a user terminal, or an address book stored in the predetermined area of the gift provision apparatus 300, requests the provision of a gift for each group included in the address book, and receives information about whether to receive or use the gift.

The gift provision apparatus 300 provides URL (Unique Resource Locator) information, in which information about a product is stored, to the user terminal 100, provides a gift icon corresponding to the product, to the address book selected by the user terminal 100, and manages the download, use, and usable period expiration of the gift icon.

The gift provision apparatus 300 includes an address-book management module 310, a product information management module 320, a gift icon management module 330, a control module 340, a communication module 350, and a database 360 which stores and manages an address book, information about products, and information related to gift icons.

The address-book management module 310 manages an address book which includes at least one of the telephone number and e-mail address of a mobile terminal and consists of at least one group, and provides the address book at the request of the user terminal 100.

The product information management module 320 provides product information about products to be provided as a gift, or URL information corresponding to the product information to the user terminal 100.

The gift icon management module 330 manages and provides a gift icon corresponding to a product, and manages whether the gift, selected based on the product information, is provided according to the address book or whether the gift icon is used. Furthermore, the gift icon management module 330 is in conjunction with the address book, and, therefore, manages the download, use, and usable period expiration of the gift icon.

When one of products, provided by the product information management module 320, is selected as a gift, a receipt terminal which will receive the product is selected from the address book and settlement is finished, and the control module 340 provides a gift icon corresponding to the product to the mobile terminal.

Furthermore, the control module 340 provides information about the gift icons which are managed by the gift icon management unit to the user terminal, and, in an application example, periodically provides a list of products to be provided as a gift for a certain period by a user terminal and information about the telephone numbers and e-mails of the receipt terminal to the user terminal.

Figure 13:
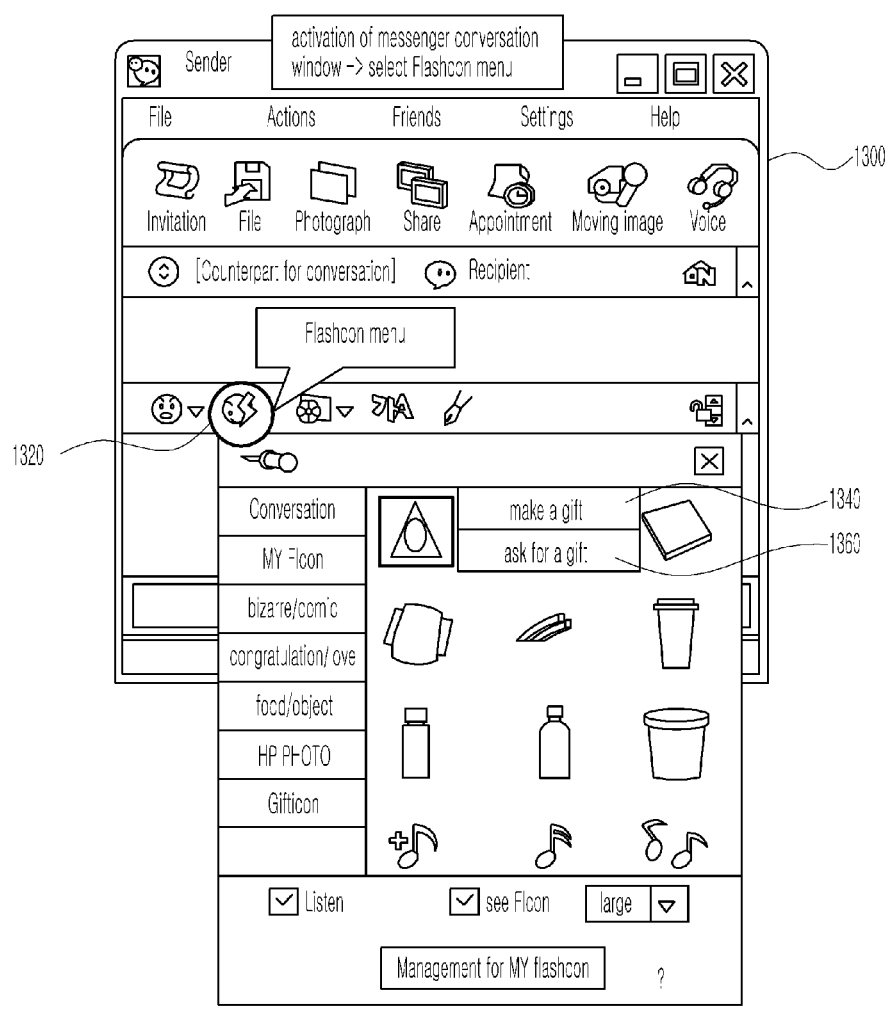

In an application example, in the wired terminal 110 and the receipt terminal 500, software (hereinafter referred to as a messenger) enabling messages and data to be transmitted and received in real time through a wired communication network is executed and an example of the messenger is illustrated in FIG. 13.

The wired terminal 110 includes a product information management module 112, a gift icon management module 114 and a control module 116.

The product information management module 112 displays product information about a product requested or provided as a gift or URL information corresponding to the product information on the screen of the wired terminal 110 and the product information and the URL information are provided from the gift provision apparatus 300.

The gift icon management module 114 manages and provides a gift icon corresponding to the product, and manages whether the gift icon has been used. It is preferred that the gift icon be produced and provided by the gift provision apparatus 300.

Furthermore, although the management of the usable period, whether the gift icon has been used or the like, is performed by the wired terminal 110, it is periodically transmitted to the gift provision apparatus 300, thereby enabling the gift provision apparatus 300 to perform integral management.

When one of the products, provided by the product information management module 112, is selected as a gift, a receipt terminal which will receive or request the product is selected from the address book and settlement is finished, the control module 116 provides a gift icon to the receipt terminal through the messenger.

Furthermore, when a button for gift provision is displayed on the screen of the wired terminal 110, the control module 116 displays a settlement screen related to gift provision and, when a button for request of the gift is selected, displays guide messages and the settlement screen on the screen of the receipt terminal which will request a gift.

In the messenger executed in the wired terminal 110 and the receipt terminal 500, the telephone numbers of first and second mobile terminals are respectively registered by the users of the wired terminal 110 and the receipt terminal 500, so that transmitted and received gift icons are transmitted to the first and second mobile terminals selected by a user or automatically registered.

The first and second mobile terminals are provided with a gift corresponding to the gift icon in an affiliated shop appointed by the gift icon or receive a message prohibiting the usage of the gift icon from the gift provision apparatus 300 when the usable period of the gift icon has expired.

[A First Embodiment]

The operation of the present disclosure configured as described above is described below.

Figure 2:
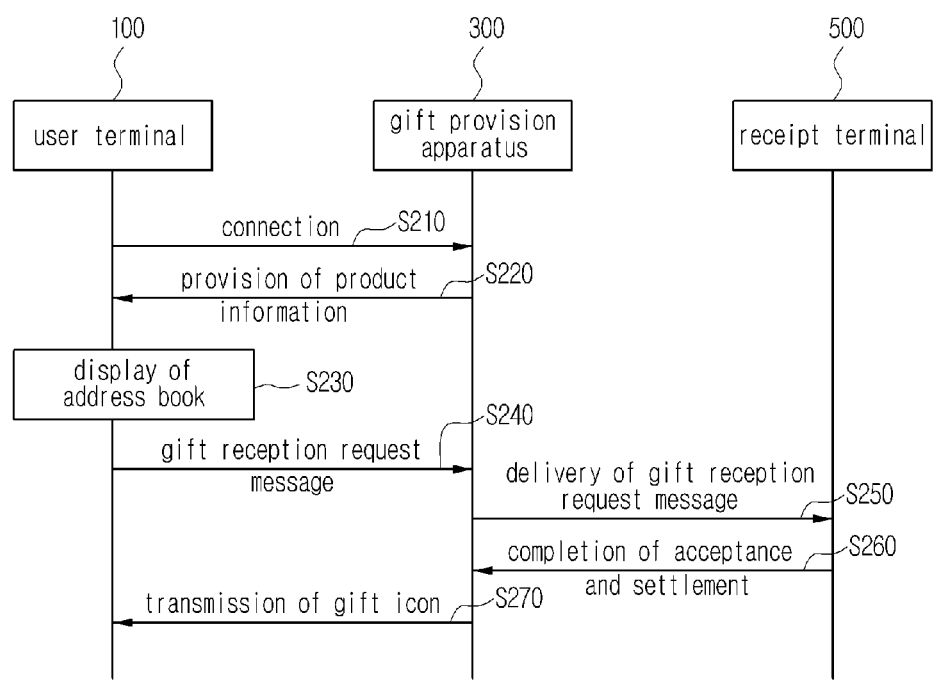
FIG. 2 is a message flow illustrating a method of providing a gift using a communication network according to a first embodiment of the present disclosure.

FIG. 2 is a message flow illustrating a method of providing a gift using a communication network according to a first embodiment of the present disclosure.

When the user terminal 100 is connected to the gift provision apparatus 300 through the communication network 200, the gift provision apparatus 300 provides information about a product to be provided as a gift to the user terminal 100 at steps S210 and S220. An example of a wap page provided when the user terminal 100 is connected to the gift provision apparatus 300 is illustrated in FIG. 5.

Figure 5:
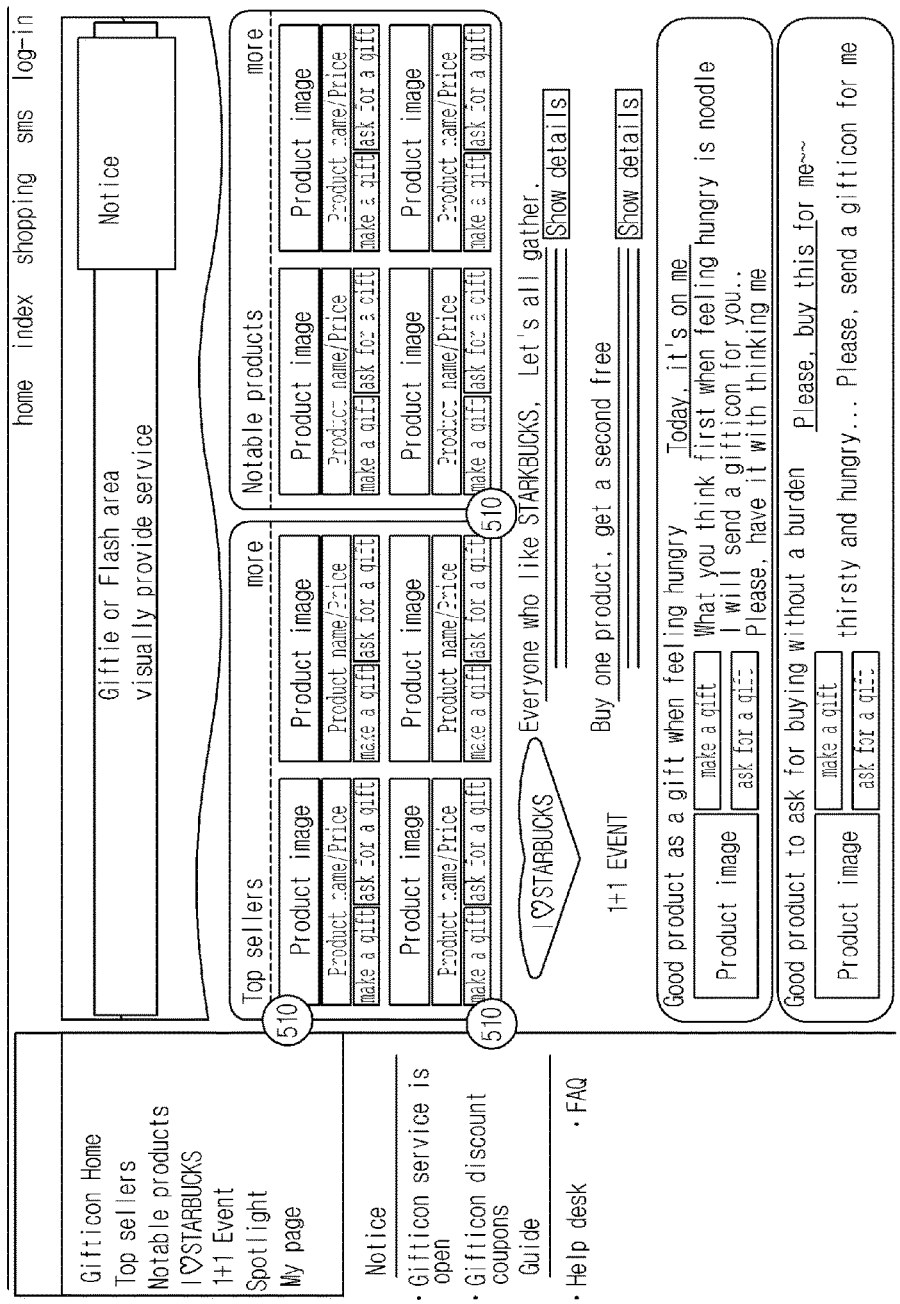
Figure 6:
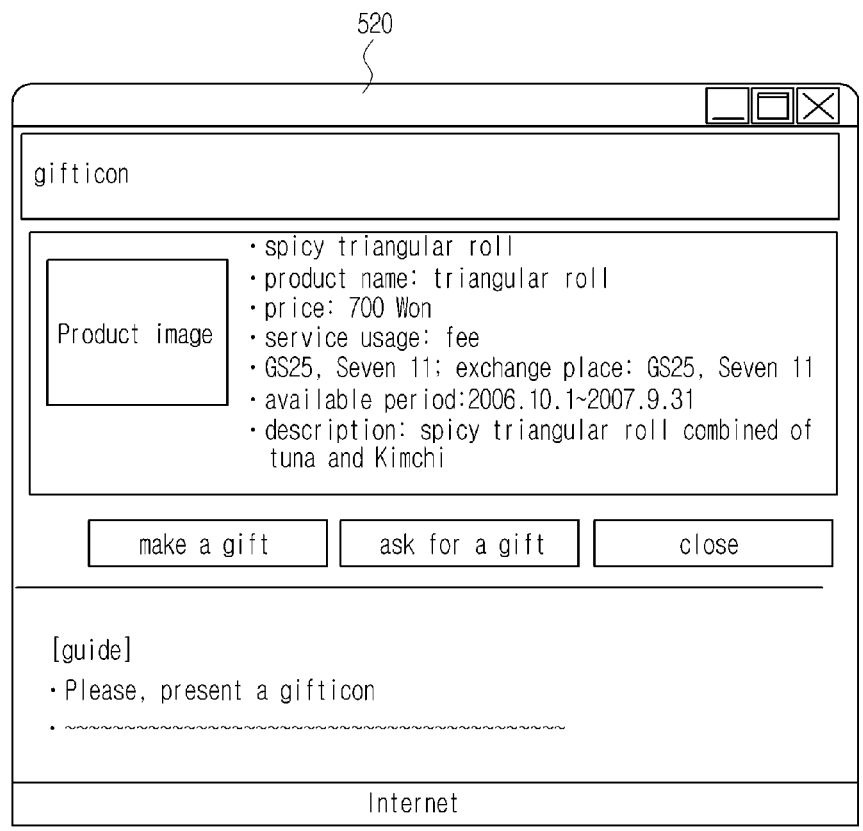

When information about images and their details are referred to for a plurality of products to be transmitted or received as a gift through a wap page, reference number 510 or 520 of FIG. 5 are selected. When reference number 510 or 520 is selected, the wap page of FIG. 6 is displayed on the screen of the user terminal 100.

Figure 7:
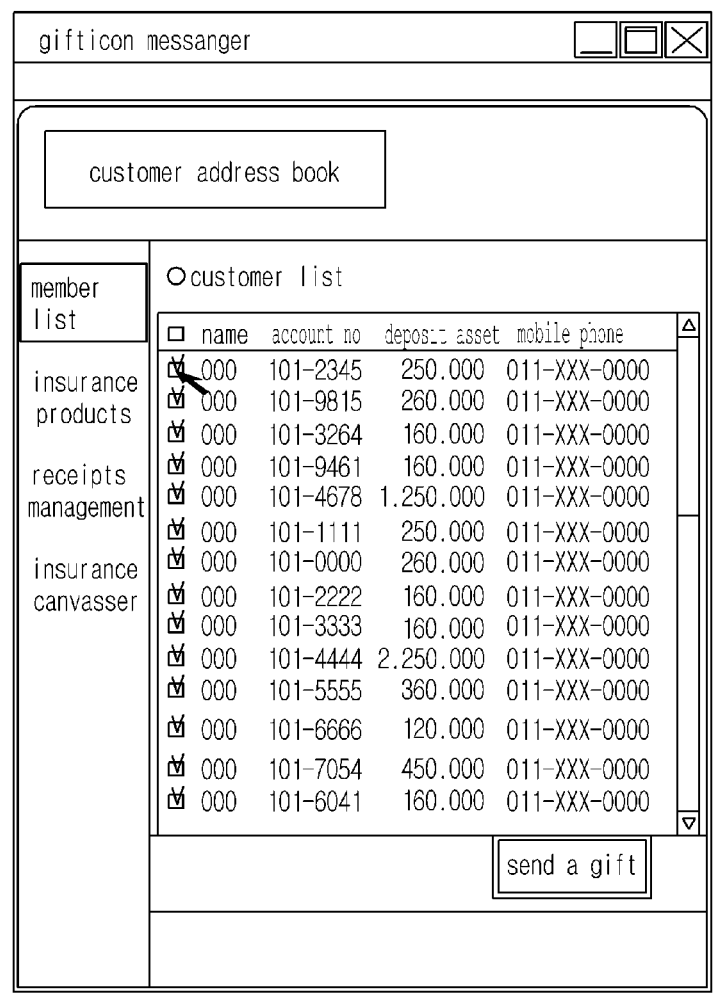

When the user of the user terminal 100 is provided with information about the products, and then selects one of products as a gift, an address book corresponding to the user terminal 100 is displayed on the screen of the user terminal 100 as illustrated in FIG. 7 at step 230.

In the address book, an e-mail address is stored when the receipt terminal is a wired terminal and a telephone number for allowing reception of a short message or a multimedia message is stored when the receipt terminal is a mobile terminal.

The user terminal 100 transmits a message requesting gift provision which allows provision of a gift to a receipt terminal selected for the selected gift, or a message requesting gift reception which allows reception of the gift to the gift provision apparatus 300 at step S240.

When receiving the message requesting gift reception, the gift provision apparatus 300 provides a gift icon corresponding to the product to the receipt terminal 500. In this case, the gift provision apparatus 300 provides a wap page for settlement in order to request settlement of accounts for the gift to the user terminal 100, and, when the settlement has finished, provides the icon of the gift to the receipt terminal 500. When the receipt terminal 500 accepts the gift icon, a message for completion of acceptance is registered in the gift provision apparatus 300.

However, when the gift provision apparatus 300 receives the message requesting gift reception, that is, when the user of the user terminal 100 asks the receipt terminal 500 to buy the gift, the gift provision apparatus 300 delivers request details received from the user terminal 500 to the receipt terminal 500 at step S250. An example of a web or a wap page provided to the user terminal 100 by the gift provision apparatus 300 according to a request for generation of the message requesting gift reception is illustrated in FIG. 8.

Figure 8:
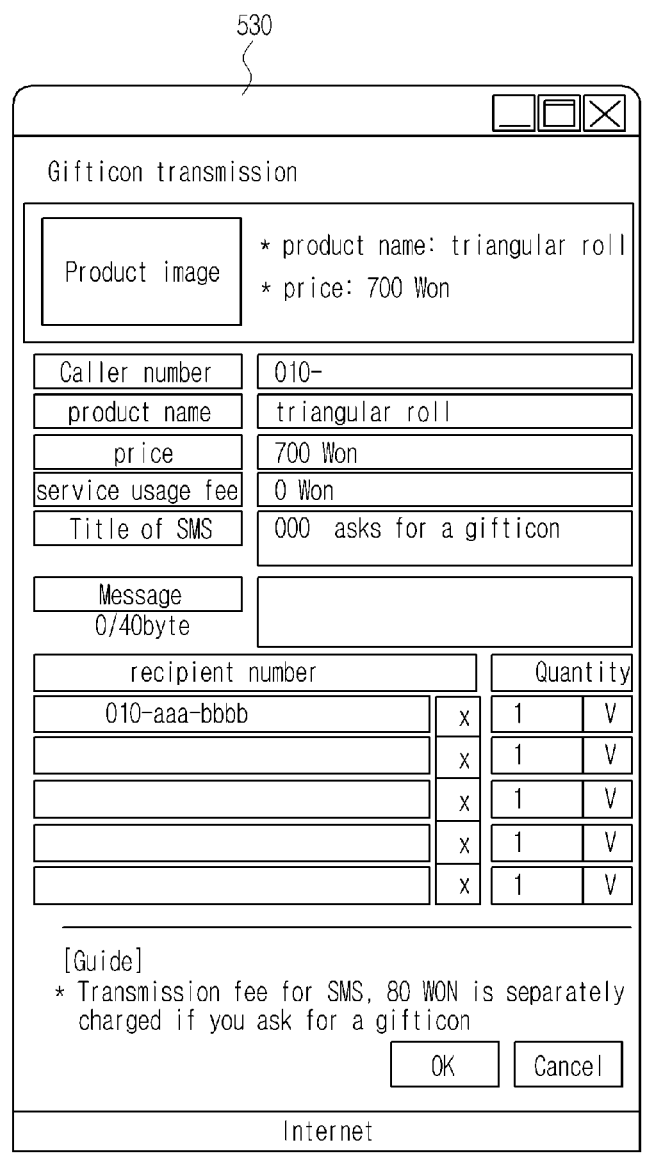

Through the web or wap page of FIG. 8, the user terminal 100 asks the receipt terminal 500 having the telephone number 010-aaa-bbbb to buy a triangular roll.

The gift provision apparatus 300, having received an acceptance message from the receipt terminal 500, provides a web or a wap page for settlement of accounts for the gift to the receipt terminal 500, and, when the settlement is finished, provides a gift icon to the user terminal 100 at steps S260 and S270.

[A Second Embodiment]

Figure 3:
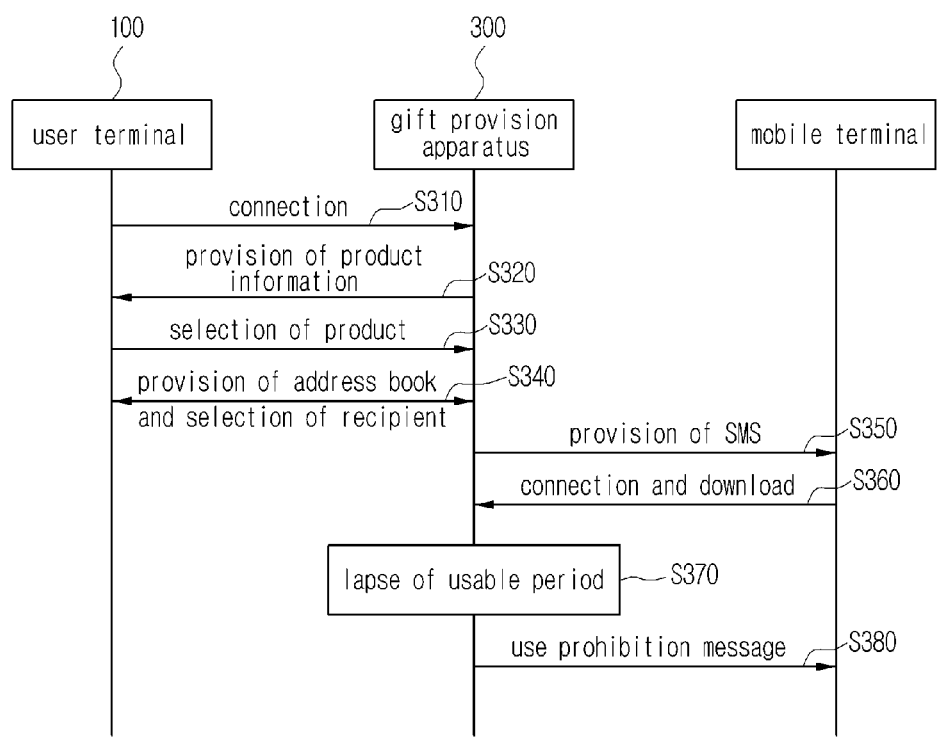
FIG. 3 is a message flow illustrating a method of providing a gift using a communication network according to a second embodiment of the present disclosure.

FIG. 3 is a message flow illustrating a method of providing a gift using a communication network according to a second embodiment of the present disclosure.

In the second embodiment, when the user terminal registers and manages an address book of customers in the gift provision apparatus 300, a method of providing a gift using the address book of customers in a lump, which is provided from the gift provision apparatus 300.

The gift provision apparatus 300 provides information about products to be provided as a gift to the user terminal 100 which is connected to the gift provision apparatus 300 through the communication network at steps S310 and S320.

When the user terminal 100 selects a gift, an address book corresponding to the ID of the user terminal 100 is provided to the user terminal 100, the user terminal 100 selects the addresses of all customers stored in the address book at steps S330 and S340. In an application example, it is possible for the user terminal 100 to select a particular customer from the list of the address book, and the address of the customer is the telephone number of a mobile terminal.

When at least one recipient which will receive the product from the address book is selected, the gift provision apparatus 300 provides a short message including a URL corresponding to the gift to the mobile terminal of the recipient at step S350.

When the mobile terminal 550 connects with the gift provision apparatus 300 using the URL and then requests download of the gift, a gift icon corresponding to the product is provided to the mobile terminal 110 at step S360.

In the gift icon, at least one of a download period or a usable period is set, and, when the period has expired, download and usage is prohibited. When the usable period has elapsed, or the gift icon has been used, the gift provision apparatus 300 provides a use prohibition message to the mobile terminal 550 at step S380.

In an application example, it is possible to register an acceptance completion message transmitted from the terminal of a shop in the gift provision apparatus 300 when the recipient accepts the gift in the shop.

Furthermore, the gift icon is of a bar-code type, the gift provision apparatus 300 authenticates the validity of the bar-code type gift icon transmitted from the POS (Point Of Sale) terminal of a predetermined shop, and transmits an authentication code corresponding to completion of the authentication to the POS terminal. When the authentication code has been received, the use of the bar-code type gift icon is permitted, and the POS terminal transmits the acceptance completion message for the gift icon to the gift provision apparatus.

[A Third Embodiment]

Figure 4:
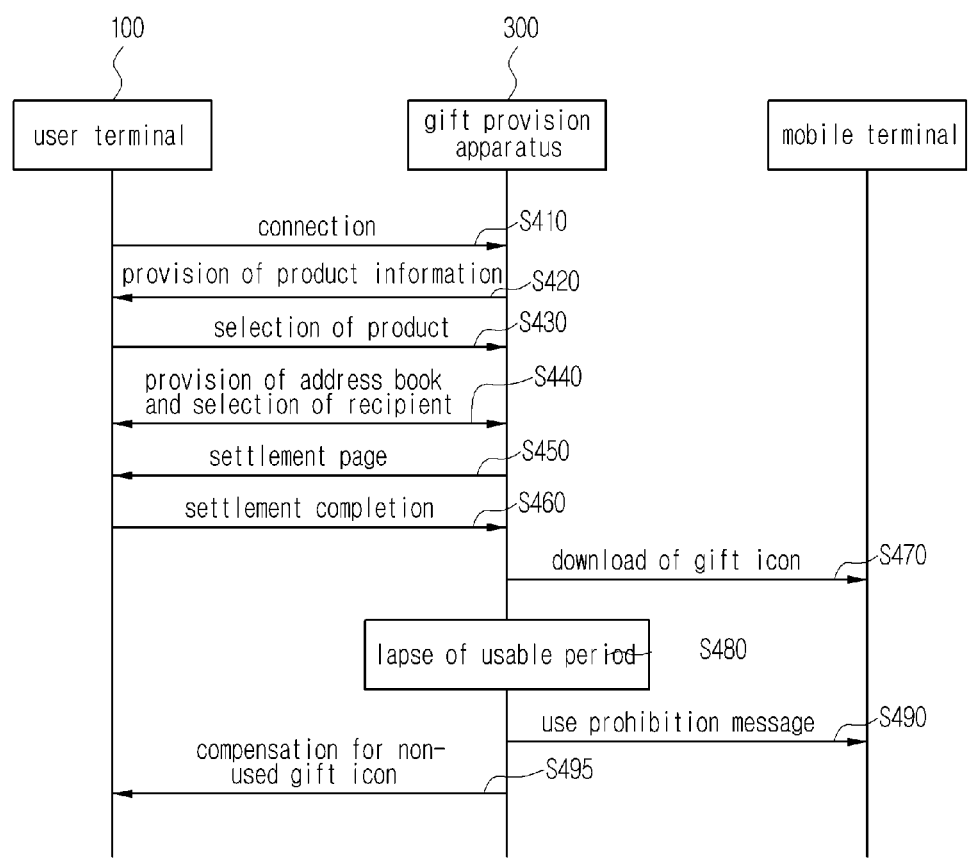
FIG. 4 is a message flow illustrating a method of providing a gift using a communication network according to a third embodiment of the present disclosure.

FIG. 4 is a message flow illustrating a method of providing a gift using a communication network according to a third embodiment of the present disclosure.

In the third embodiment, the addresses of customers are grouped, so that it is possible to provide a gift for each group in a lump sum. A method of making amends, such as refund, to the user of a user terminal for non-usage although a gift is selected and then settlement has been finished when a customer does not use a gift icon, is described below.

After an address book of grouped customers from the user terminal 100 connected to the gift provision apparatus 300 through a communication network has been registered in the gift provision apparatus 300, information about products to be provided as a gift is provided to the user terminal 100 connected to the gift provision apparatus 300 at steps S410 and S420. When the user terminal 100 selects a predetermined gift, the gift provision apparatus 300 provides the address book registered by the user terminal 100 to the user terminal 100 at steps S430 and S440.

In an application example, in the case where the address book of grouped customers is stored in the memory of the user terminal 100, when the user terminal 100 selects a predetermined product as a gift, the address book stored in the user terminal 100 is displayed on the screen of the user terminal 100.

When at least one group is selected from the address book, the gift provision apparatus 300 transmits a wap page for settlement to the user terminal 100 at step S450.

An example of the wap page for settlement is illustrated in FIG. 9. When an item for adding the accounts for the gift to a charge billed to the mobile terminal is selected, in the wap page of the FIG. 9, items to be input by the user of the user terminal 100 are displayed.

When settlement is performed by transferring money or using a credit card in the user terminal 100, a gift icon corresponding to the product is provided to mobile terminals or e-mail addresses belonging to the group at step S460 and S470.

For the gift icon, a usable period is set, so that the gift provision apparatus 300 provides a message guiding repayment of money corresponding to the gift icon which has not been used in the usable period or conversion to a reserve to the user terminal 100, and, at the same time, or sequentially transmits the usage prohibition message for the gift icon to the mobile terminal or the user terminal in which the gift icon, the usable period has expired, resides at steps s480, S490 and S495.

Figure 10:
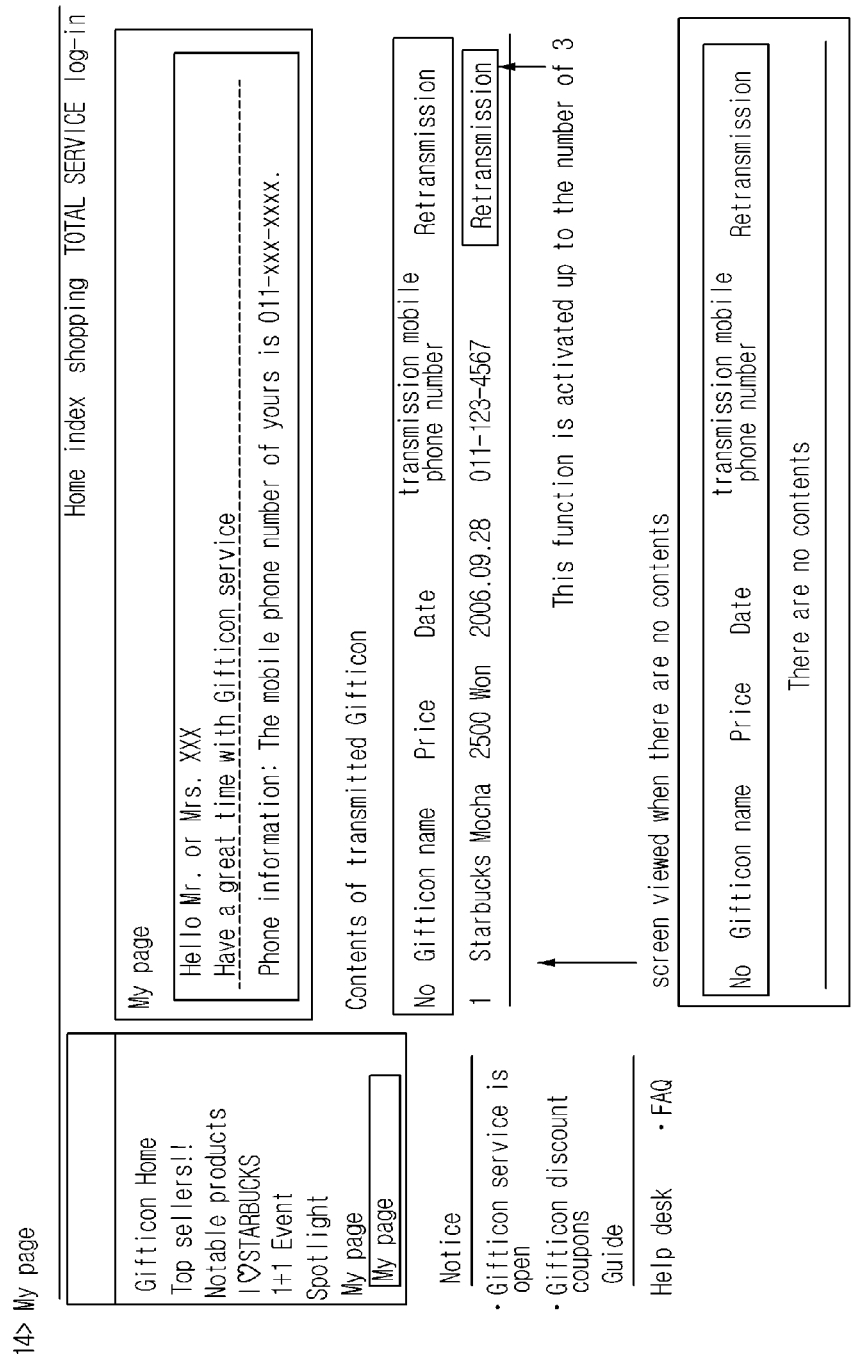

The gift provision apparatus 300 provides contents for gifts provided for a predetermined period to the user terminal, and, if the gift icon is received by the user terminal, that is, an e-mail, or the ID of the user terminal provided by the gift provision apparatus 300, it is possible to register the gift icon in [My Page] as illustrated in FIG. 10 and manage it.

[A Fourth Embodiment]

Figure 11:
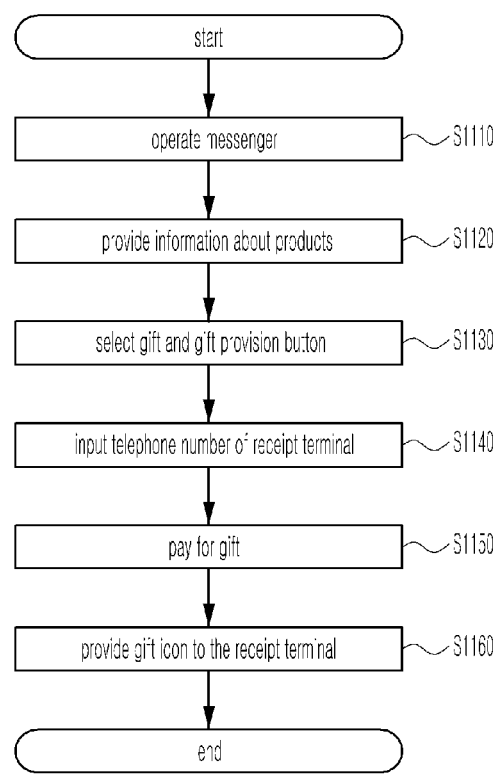
FIG. 11 is a flowchart illustrating a method of transmitting and receiving a gift icon using a messenger according to a fourth embodiment of the present disclosure.

FIG. 11 is a flowchart illustrating a method of transmitting and receiving a gift icon using a messenger according to a fourth embodiment of the present disclosure.

Referring to FIG. 11, the user terminal 100 and the receipt terminal 500 respectively operate software (hereinafter referred to as a messenger) enabling messages and data to be transmitted and received in real time through a wired communication network, thereby connecting with each other. A messenger window is displayed on a screen as illustrated in FIG. 13 at step S1110.

When a flash-con menu 1320 is selected in the messenger window 1300 illustrated in FIG. 13, information about a product corresponding to a gift is displayed, and, a [make a gift] or [ask for a gift] item is displayed at step S1120 when a mouse pointer is placed on the product.

In the state in which the mouse pointer is placed on a desired product in the messenger window 1300 of FIG. 13, when [make a gift] item 1340 is selected from [make a gift] item 1340 or [ask for a gift] item 1360, a transmission window as illustrated in FIG. 14 is displayed, and the telephone number of the receipt terminal which will receive the gift icon corresponding to the product in the transmission window is input at steps S1130 and S1140.

In an application example, when there are a plurality of receipt terminals which will receive the gift icon, the transmission window as illustrated in FIG. 15 is displayed, so that it is possible to input the telephone number of the plurality of receipt terminals and transmit the gift icon.

Figure 16:
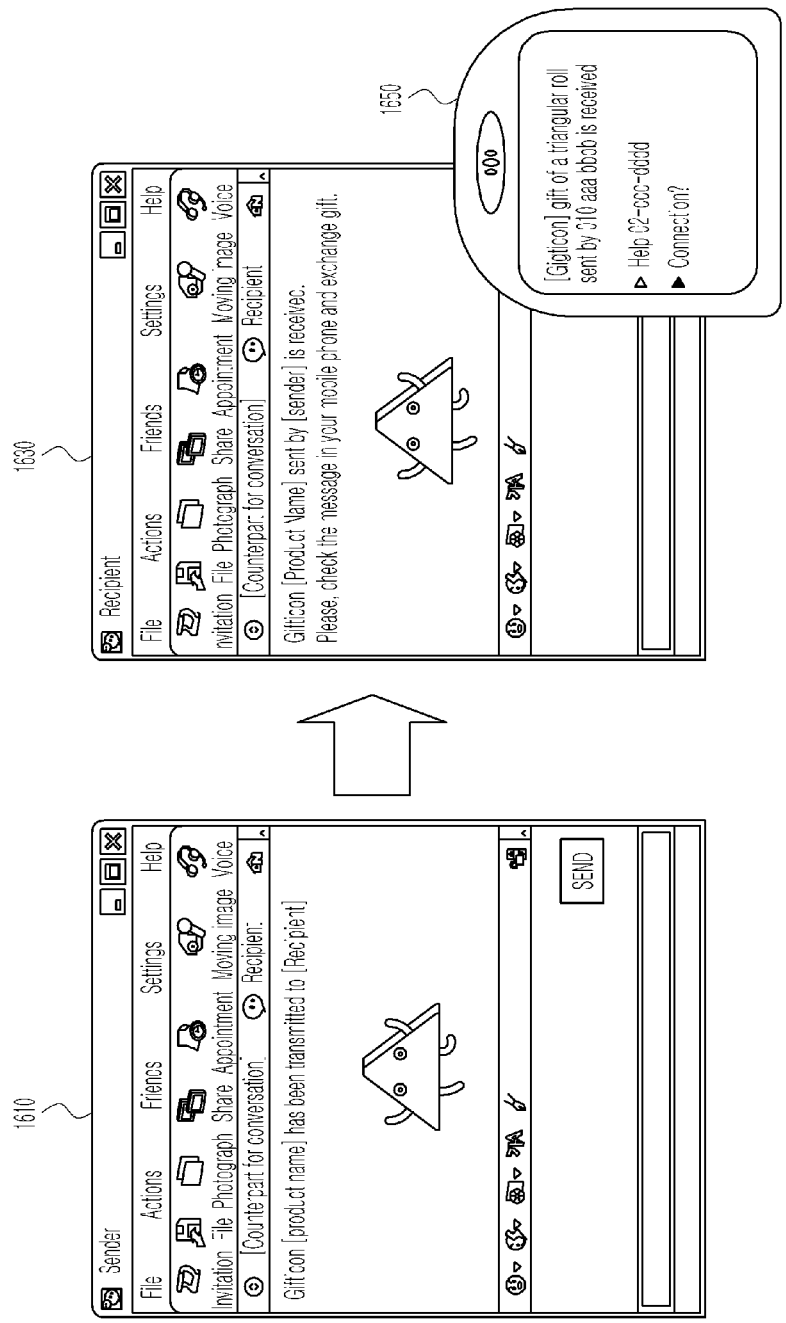

When settlement for the gift has finished, the terminal transmits the gift icon to the receipt terminals through the messenger, and the transmission windows 1610 and 1630 for gift icons respectively displayed in the user terminal 100 of a sender which transmits the gift icon and the terminal of a receiver are displayed in FIG. 16 at steps S1150 and S1160.

In an application example, when the gift icon is transmitted to the receipt terminal 500, it is possible to provide a predetermined short message including a URL in which the gift icon is stored to the mobile terminal which is in conjunction with the receipt terminal 500 (see reference numbers 1650 of FIG. 16)

When the mobile terminal connects with the gift provision apparatus 300 using the URL and requests the download of the gift, the gift icon corresponding to the product is provided to the mobile terminal.

[A Fifth Embodiment]

Figure 12:
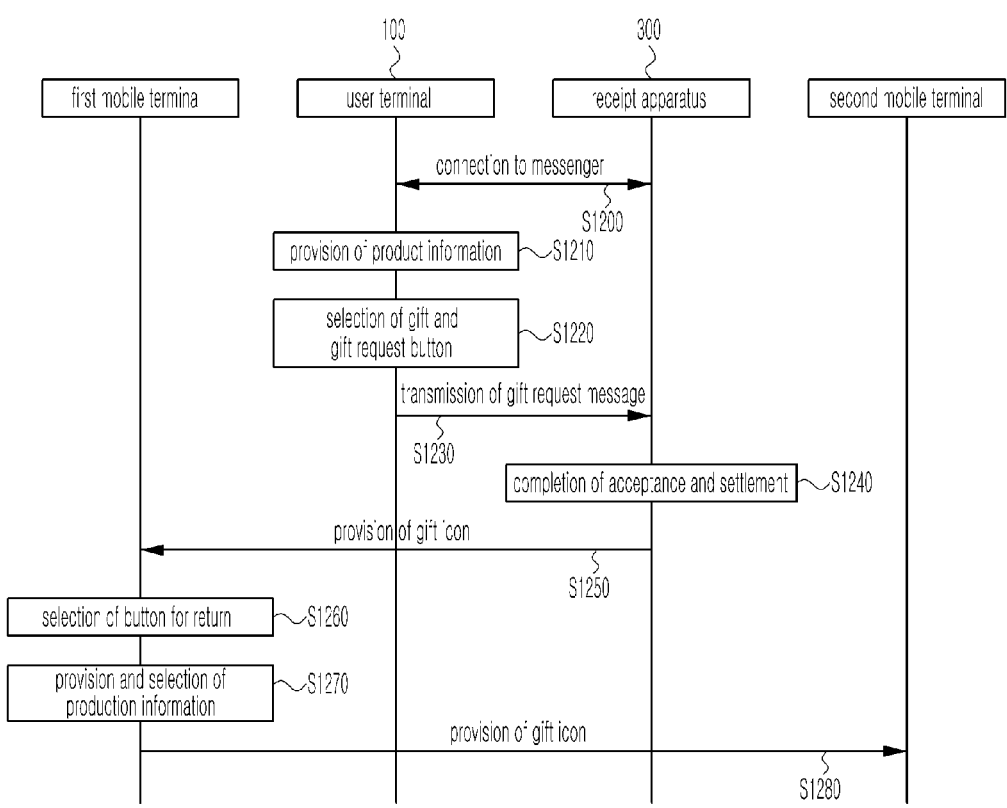
FIG. 12 is a flowchart illustrating a method of transmitting and receiving a gift icon using a messenger according to a fifth embodiment of the present disclosure.

FIG. 12 is a flowchart illustrating a method of transmitting and receiving a gift icon using a messenger according to a fifth embodiment of the present disclosure.

When the user terminal 100 and the receipt terminal 500 respectively operating software (hereinafter referred to as a messenger) that enables messages and data to be transmitted and received in real time through a wired communication network connect with each other, a messenger window 1300 as illustrated in FIG. 13 is displayed at step S1200.

When a flash con menu 1320 is selected in the messenger window displayed in the screen of the user terminal 100, information about products corresponding to gifts is displayed and, when the mouse pointer is placed on one of the products, a [make a gift] item and [ask for a gift] item are displayed at step S1210.

When the mouse pointer is placed on a desired product in the messenger window 400 of FIG. 13 and [ask for a gift] item 1360 is selected from [make a gift] item 1340 and [ask for a gift] item 1360, that is, a gift request item, is selected, a transmission window as in FIG. 14 is displayed. The telephone number of the receipt terminal which will request a gift icon corresponding to the product is input on the transmission window and the gift request message is then transmitted to the receipt terminal 500 at steps S1220 and S1230.

In an application example, if there are a plurality of receipt terminals which request the gift icon, it is possible to input the telephone numbers of the plurality of receipt terminal and transmit the gift icon.

When the receipt terminal 500 selects an acceptance message for gift request, the gift icon corresponding to the product is transmitted to the user terminal 100 or the first mobile terminal connected to the terminal at steps S1240 and S1250. The first mobile terminal is a mobile terminal registered in the messenger by the user of the user terminal 100, and the second mobile terminal is a mobile terminal registered in the messenger by the user of the receipt terminal 500.

Figure 17:
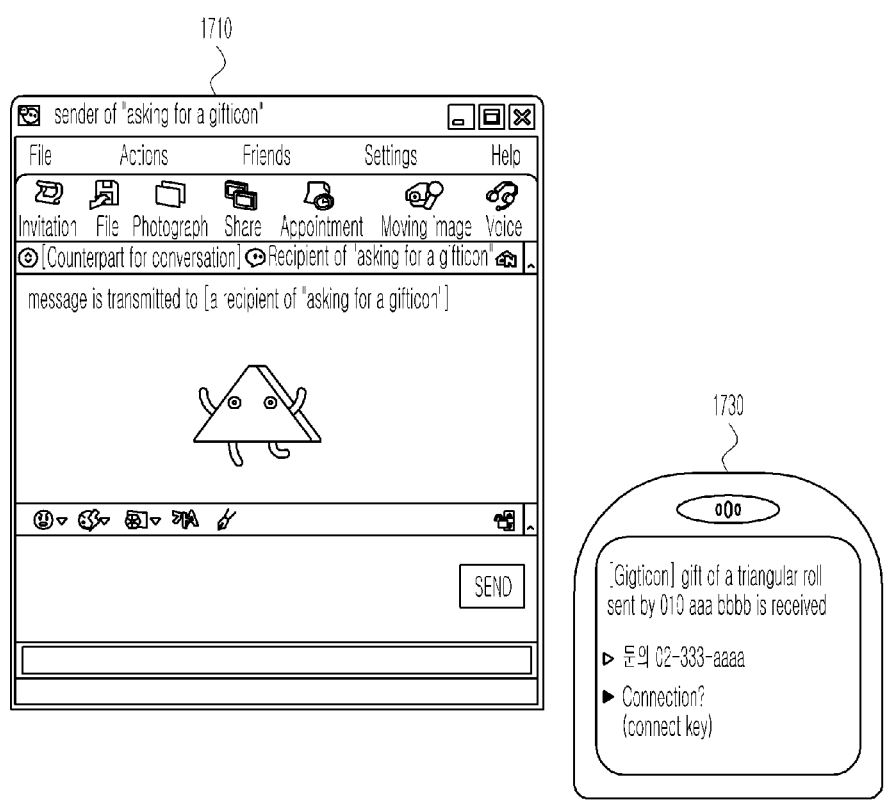
Figure 18:
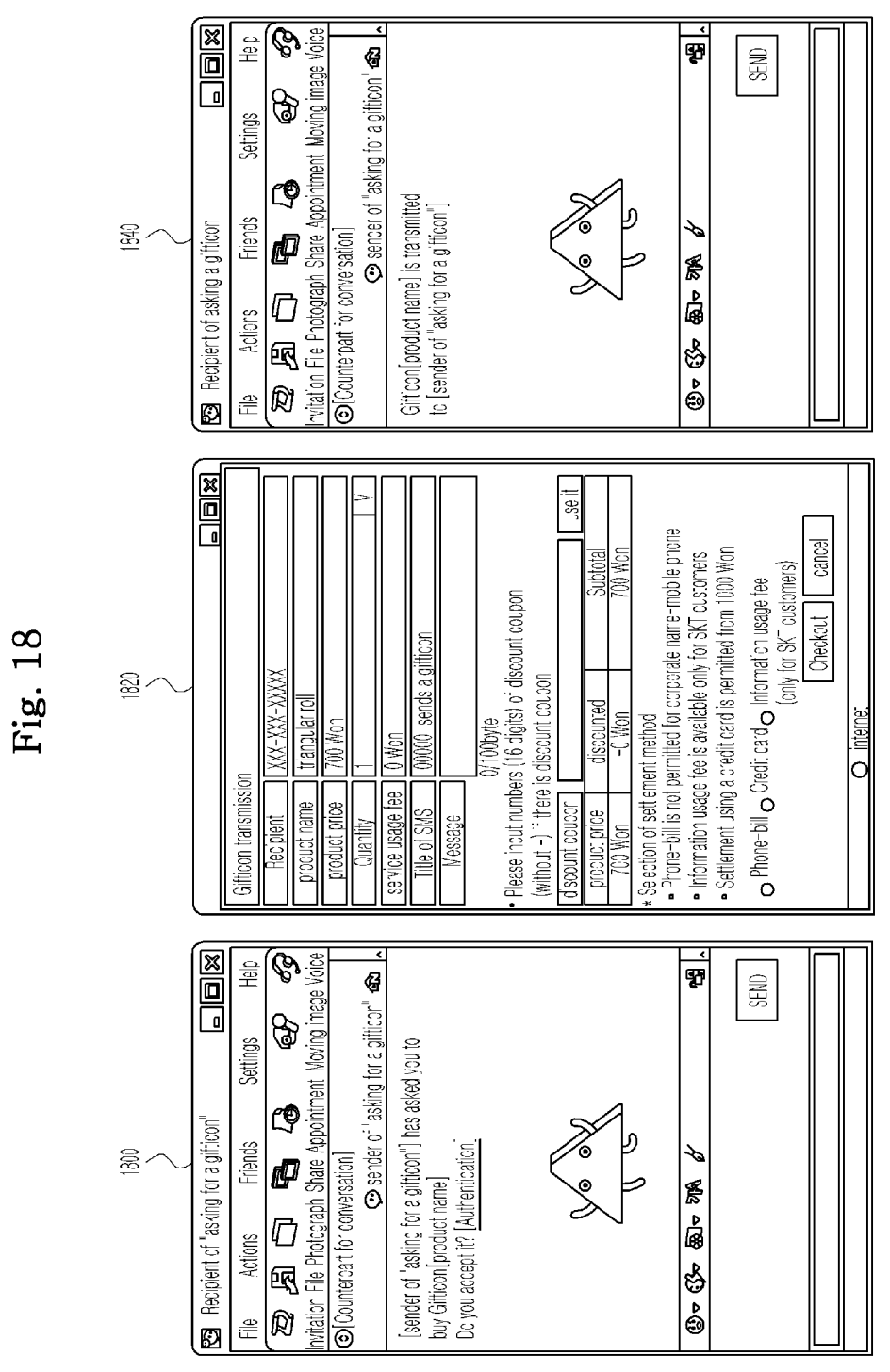

Referring to FIG. 17, in an application example, the messenger window indicated by reference number 1710 is displayed on the user terminal 100 after the gift request message has been transmitted to the receipt terminal 500. When the receipt terminal 500 has accepted the gift request and settlement has been finished, a message indicated by reference number 1730 is transmitted to the first mobile terminal. In FIG. 18, a messenger window 1800 which is displayed in the receipt terminal 500 according to the gift request of the user terminal 500, a settlement window 820 enabling settlement after acceptance of the gift request, and a messenger window 1840 after the settlement has been finished are displayed.

In this case, at least one of information about the user terminal 100 or the mobile terminal which receives the gift icon, and the download period and usable period of the gift icon is set and is recorded in the gift provision apparatus 300. When the gift icon has been used, or the usable period has expired, the gift provision apparatus 300 prohibits the gift icon from being used anymore and then transmits the use prohibition message for the gift icon to the mobile terminal which downloaded the gift icon.

Furthermore, when a user having the gift icon accepts the gift in a predetermined shop, an acceptance completion message transmitted from the terminal of the shop is registered in the gift provision apparatus 300, thereby prohibiting the gift icon to be used again.

In an application example, the usable period of the gift icon is set, so that a message guiding repayment of money corresponding to the gift icon which has not been used in the usable period or conversion is transmitted to a terminal which settles accounts for the gift icon. Furthermore, it is possible to provide contents for gift icons transmitted for a predetermined period to the user terminal 100 or the receipt terminal 500.

When the gift icon is transmitted to the user terminal 100 or the first mobile terminal, a button for replying for the screen of the user terminal 100 or the first mobile terminal is displayed.

In an application example, when the gift icon is transmitted to the user terminal 100, it is possible for the user terminal 100 to download the gift icon to the first mobile terminal.

Another application example is described with reference to FIG. 19 in detail. When the receipt terminal 500 requests transmission of the gift icon, a guide message for the gift icon is transmitted to the screen of the first mobile terminal as in reference number 1910, and, when download of the gift icon has been completed by the user of the first mobile terminal (see reference numbers 1920 and 1930), a button for [return] as in reference number 1940 displayed on the screen of the first mobile terminal is generated at step S1260.

Figure 19:
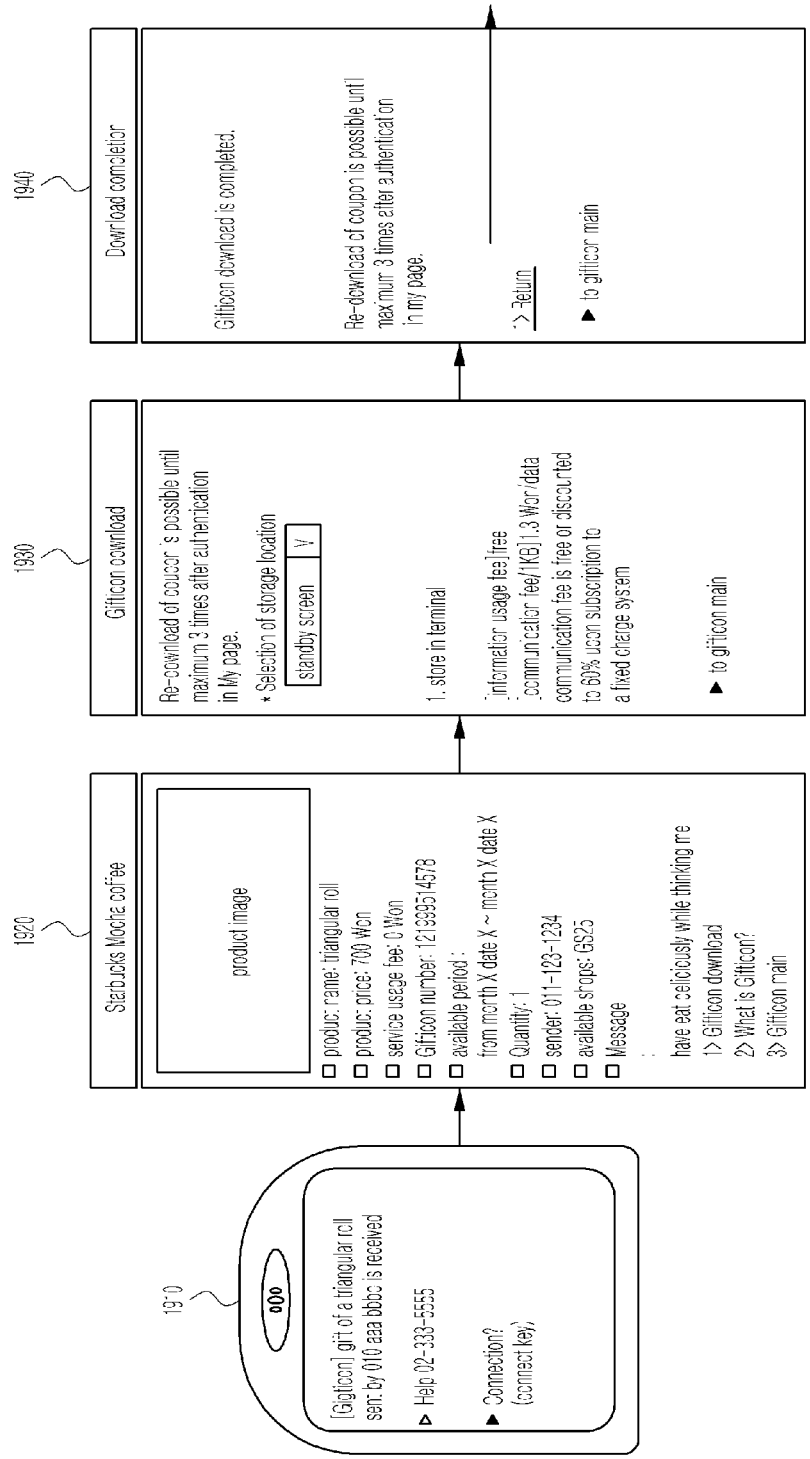

In this case, when the button for [return] is selected by a user, as illustrated in FIG. 19, gift information or a gift list (not shown) is displayed to enable the user to select at least one gift by way of return. A procedure for settlement after selection of the gift is same as illustrated above (S1270).

When the button for return is selected and a gift is determined, a gift icon corresponding to the gift is transmitted to the receipt terminal 500 or the second mobile terminal at step S1280.

[A Sixth Embodiment]

Figure 21:
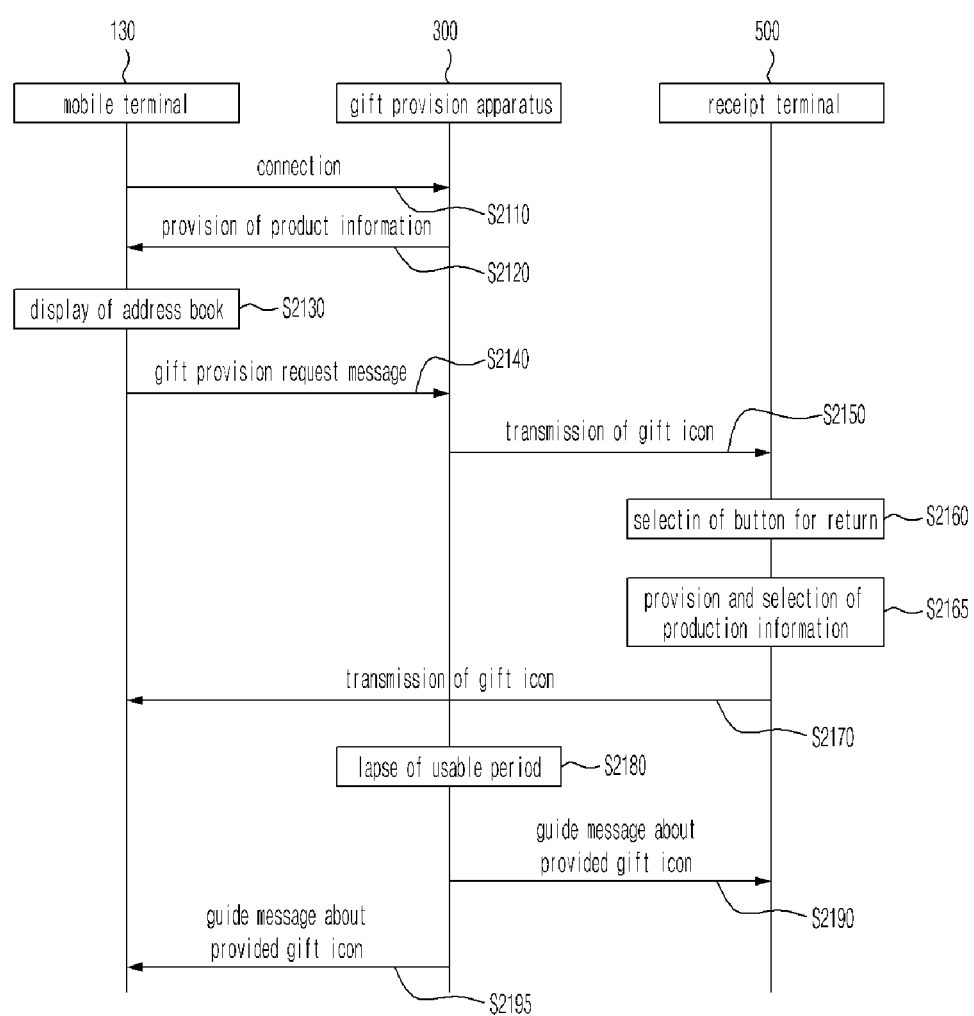
FIG. 21 is a message flow illustrating a method of providing a gift icon using a mobile terminal according to a sixth embodiment of the present disclosure.

FIG. 21 is a message flow illustrating a method of providing a gift icon using a mobile terminal according to a sixth embodiment of the present disclosure.

Figure 24:
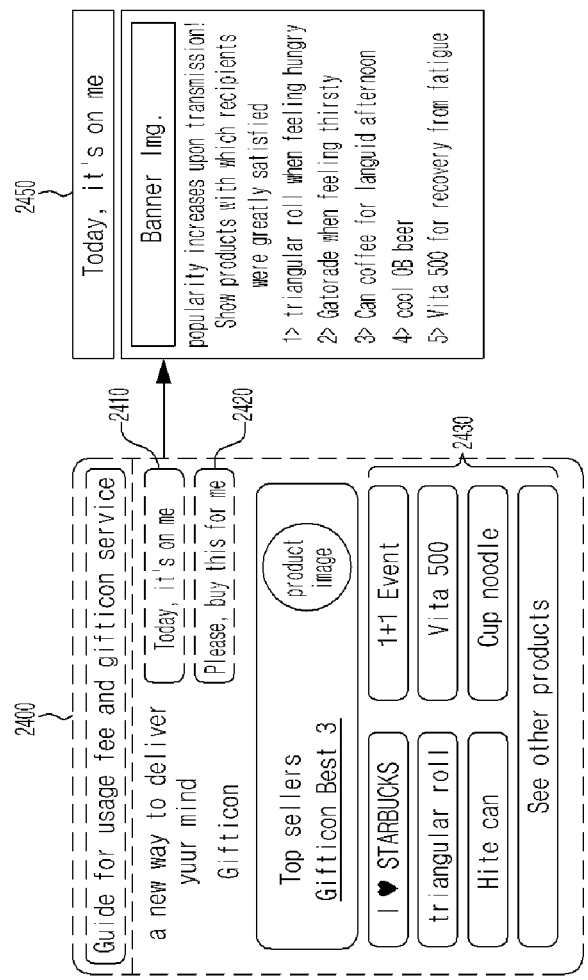

When connection with the gift provision apparatus 300 is performed through a mobile communication network, a wap page as illustrated in FIG. 24 is displayed and then information about products corresponding to a gift is provided to the mobile terminal 130 through the wap page 2400 at steps S2110 and S2120.

Referring to the wap page 2400 of FIG. 24, the wap page 2400 includes a gift provision button 2410, a gift request button 2420 and a gift list providing information about the products. It is possible to select one of the gifts from the gift list 2450 displayed after the gift provision button 2410 has been selected, and acquire information 2470 about products corresponding to a gift.

In an application example, when one of buttons indicated by reference number 2430 is selected in the wap page 2400, information about the selected product 2470 is displayed.

When a product is selected, the wap page indicated by reference number 2490 is displayed on the screen of the mobile terminal 130, and when [search address book] item 2492 is selected, the address book stored in the mobile terminal 130 is displayed. The receipt terminal 500 which will receive a gift icon corresponding to the product is selected from the address book at step S2130.

In an application example, in the wap page indicated by reference number 2490, item 2494 for enabling the telephone number or e-mail of the receipt terminal to be input is included.

When the mobile terminal 130 selects a button 2410 for provision of the gift icon, a message requesting gift provision is transmitted to the gift provision apparatus 300, and the gift icon according to the message requesting gift provision is provided to the receipt terminal 500 at steps S2140 and S2150.

Additionally, when the mobile terminal 130 selects the provision button, a wap page for settlement is displayed on the mobile terminal 130, and when the settlement has been finished, the gift icon is provided to the receipt terminal 500.

Figure 26:
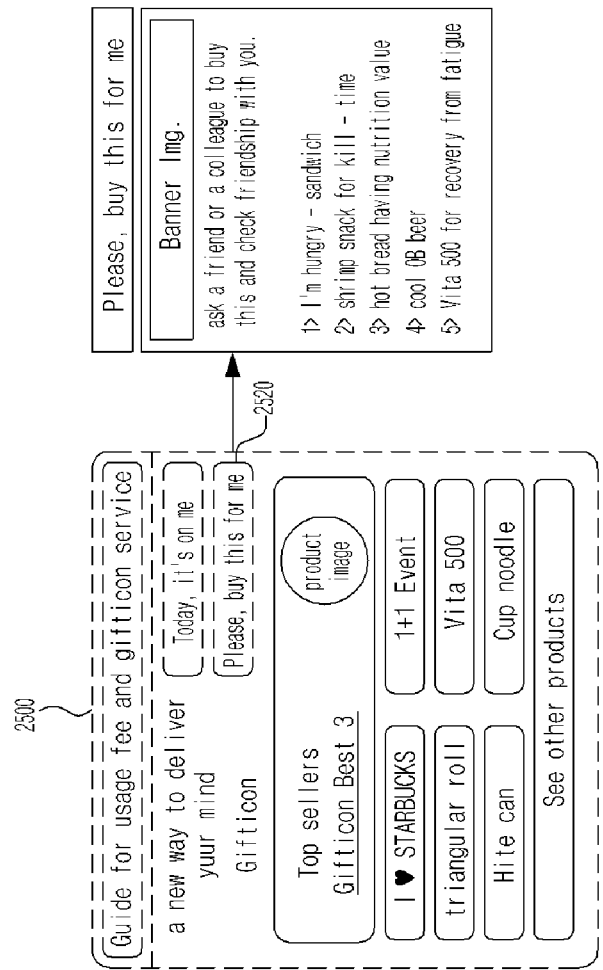
Figure 28:
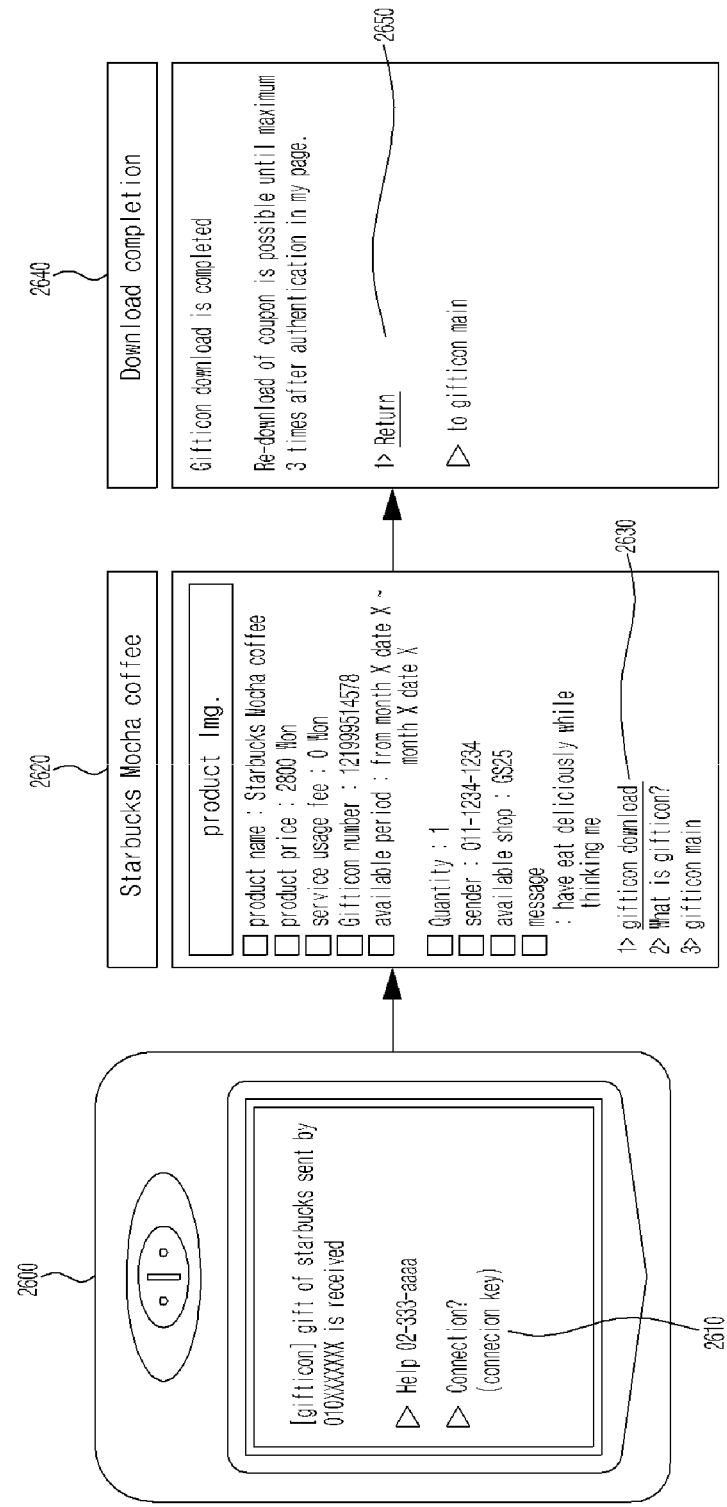

The gift icon is received as a short message having a URL as illustrated in reference number 2600 of FIG. 26, and when the URL 2610 is selected, the screen as illustrated in reference number 2620 is displayed on the receipt terminal 500. In this case, when the button 2630 for download of the gift icon is selected and the gift icon has been downloaded from a gift provision apparatus 300 or a predetermined server connected through the URL, the button 2650 for return is displayed. An example of the gift icon downloaded is illustrated in FIG. 28.

Figure 27:
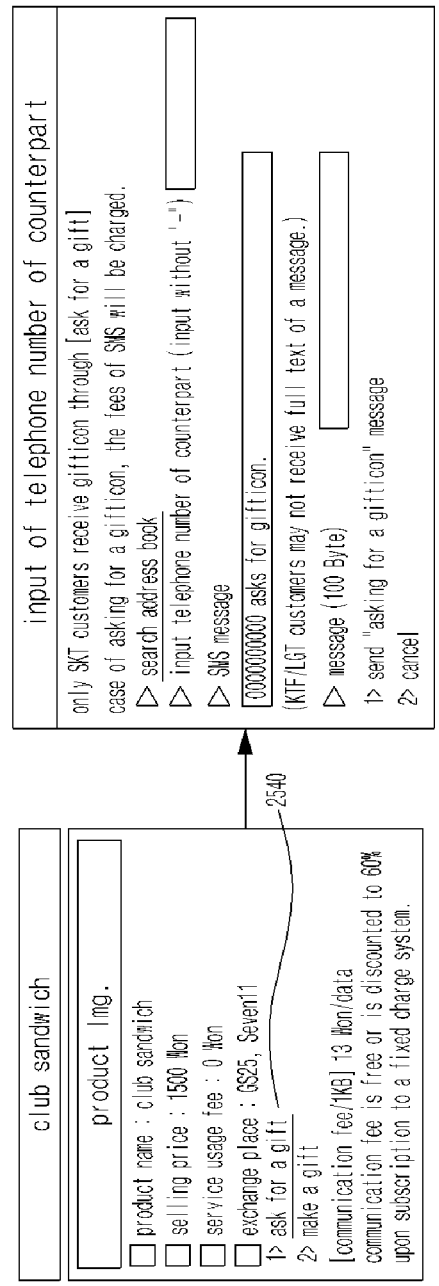

FIG. 27 illustrates information about the products or a gift list displayed on the screen of the receipt terminal 500 when the receipt terminal 500 selects the button 2650 for return.

When the button 2650 for return is selected, and then the gift is selected, the telephone number 2710 of the mobile terminal providing the gift icon to the receipt terminal is displayed and, it is possible for a user to additionally input the telephone number of another terminal at steps S2160 and S2165.

Therefore, the gift icon corresponding to the product is transmitted to the terminal of the receipt terminal at step S2170.

The usable period of the gift icon is set, so that a message guiding repayment of money corresponding to the gift icon which has not been used in the usable period or conversion to a reserve is transmitted to the mobile terminal 130 and the receipt terminal 500 sequentially or at the same time at steps S2180, S2190, and S2195.

In an application example, the gift icon has a bar-code type, the gift provision apparatus 300 authenticates the validity of the bar-code type gift icon transmitted from the POS (Point Of Sale) terminal of a predetermined shop, and transmits an authentication code corresponding to completion of the authentication to the POS terminal. When the authentication code has been received, the use of the bar-code type gift icon is permitted, and the POS terminal transmits the acceptance completion message for the gift icon to the gift provision apparatus.

[A Seventh Embodiment]

Figure 22:
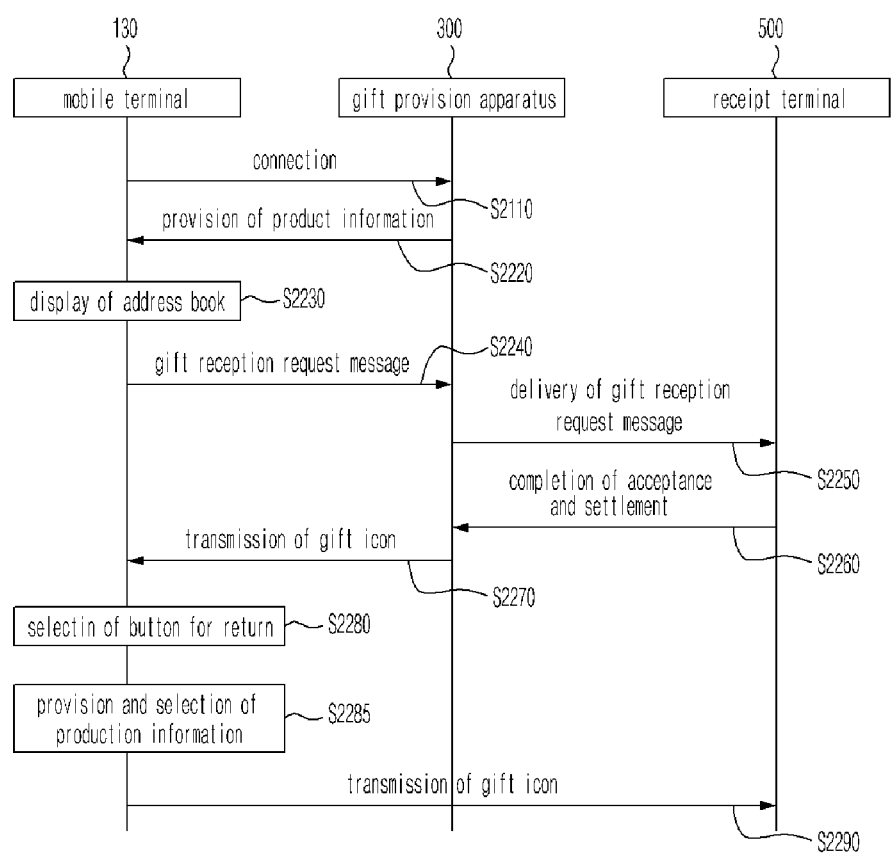
FIG. 22 is a message flow illustrating a method of providing a gift icon using a mobile terminal according to a seventh embodiment of the present disclosure.

FIG. 22 is a message flow illustrating a method of providing a gift icon using a mobile terminal according to a seventh embodiment of the present disclosure.

In the seventh embodiment, a method of providng a gift icon when the user of the mobile terminal 130 selects a button 2520 for asking for a gift, that is, a button requesting gift reception is described below.

Figure 25:
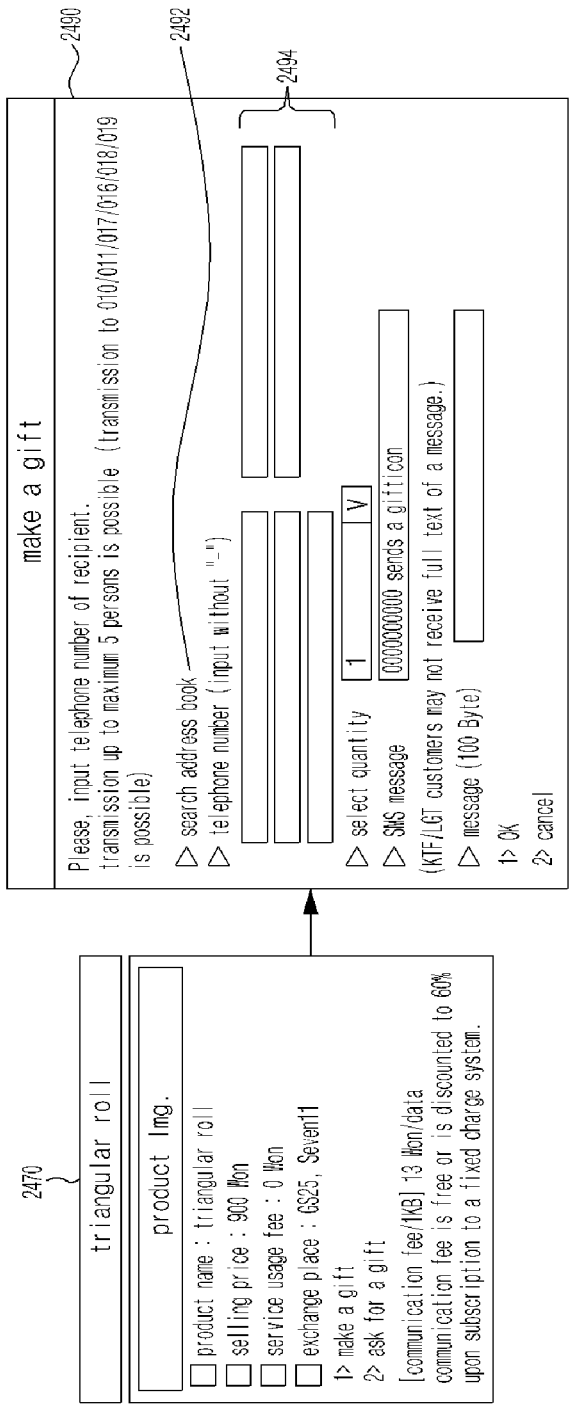

Information about products corresponding to a gift is provided to the mobile terminal 130, connected with the gift provision apparatus 300 through a mobile communication network, along with the wap page 2500 of FIG. 25 at steps S2210 and S2220.

When the mobile terminal 130 selects the product, an address book is displayed, and the mobile terminal which will request settlement for a gift corresponding to the product selects at least one from the address book at step S2230.

When the mobile terminal 130 selects a button 2540 requesting reception of the gift icon, the message requesting gift reception is transmitted to the gift provision apparatus 300, and the gift provision apparatus 300 delivers the message requesting gift provision to the receipt mobile terminal 500 at steps S2240 and S2250.

The receipt mobile terminal 500 receives the message requesting gift reception as illustrated in FIG. 29, verifies contents 2910 included in the message requesting gift reception, and selects a message for accepting the gift request. When settlement has been finished, the gift icon is transmitted to the mobile terminal 130 at steps S2260 and S2270.

When the receipt mobile terminal 500 selects the message for accepting the gift request, a predetermined short message including a URL in which the gift icon corresponding to the product is stored, is transmitted to the mobile terminal 300 which have asked for the gift.

Thereafter, when the mobile terminal 130 performs connection using the URL and requests download of the gift icon, the gift icon as illustrated in FIG. 28 is downloaded.

The construction in which the button for return is displayed on the mobile terminal 130, having received the gift icon at steps S2280 to S2290, and a predetermined gift is selected and is then transmitted to a counterpart terminal which has provided the gift icon, is identical to that illustrated in the sixth embodiment.

Furthermore, when a user having the gift icon accepts the gift in a predetermined shop, an acceptance completion message transmitted from the terminal of the shop is registered in the gift provision apparatus 300, thereby prohibiting the gift icon to be used over again.

In an application example, the gift icon has a bar-code type, the gift provision apparatus 300 authenticates the validity of the bar-code type gift icon transmitted from the POS (Point Of Sale) terminal of a predetermined shop, and transmits an authentication code corresponding to completion of the authentication to the POS terminal. When the authentication code has been received, the use of the bar-code type gift icon is permitted, and the POS terminal transmits the acceptance completion message for the gift icon to the gift provision apparatus.

[An Eighth Embodiment]

Figure 23:
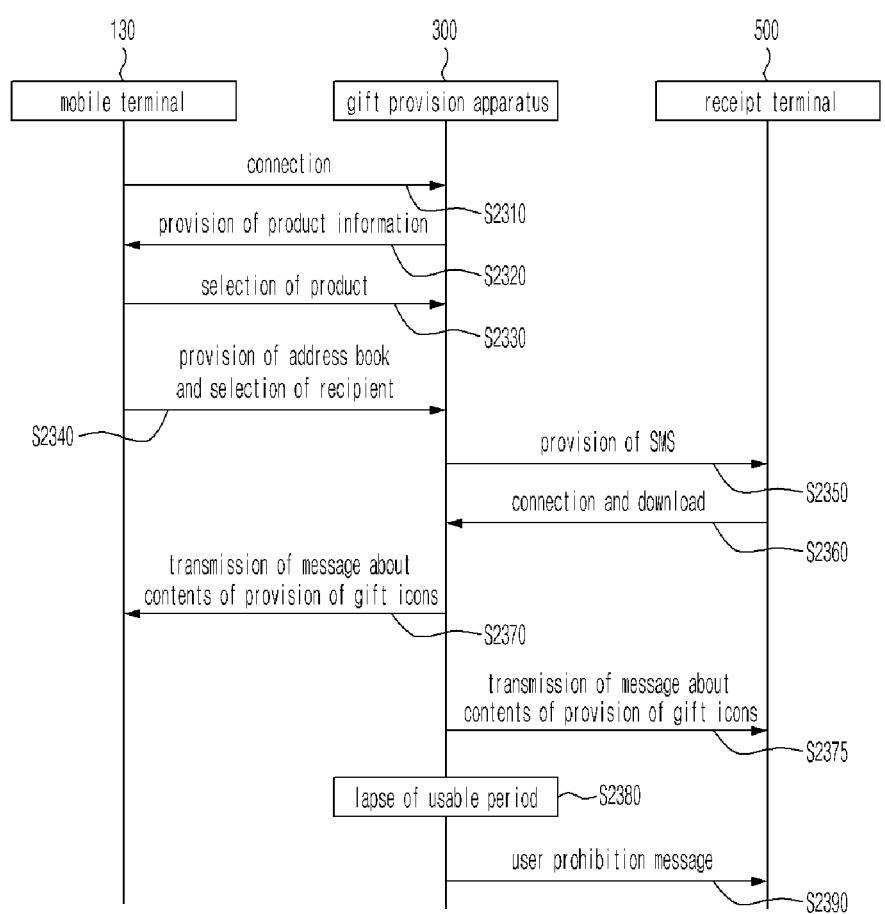
FIG. 23 is a message flow illustrating a method of providing a gift icon using a mobile terminal according to an eighth embodiment of the present disclosure.

FIG. 23 is a message flow illustrating a method of providing a gift icon using a mobile terminal according to a eighth embodiment of the present disclosure.

When information about products corresponding to a gift is provided to the mobile terminal 130 connected with the gift provision apparatus 300 through the mobile communication network and one of the products is then selected, the gift provision apparatus 300 provides an address book which is in conjunction with the mobile terminal 130 and enables selection of at least one group from the address book at steps S2310, S2320, S2330 and S2340.

When the mobile terminal 130 selects the button for provision of the gift icon, the gift icon is transmitted as described in the sixth and seventh embodiments at steps S2350 and S2360.

The gift provision apparatus 300 provides contents for gift icons transmitted for a predetermined period to the mobile terminal or the receipt terminal which has settled the accounts for the gift icons at steps S2370 and S2375.

Figure 30:
Figure 31:
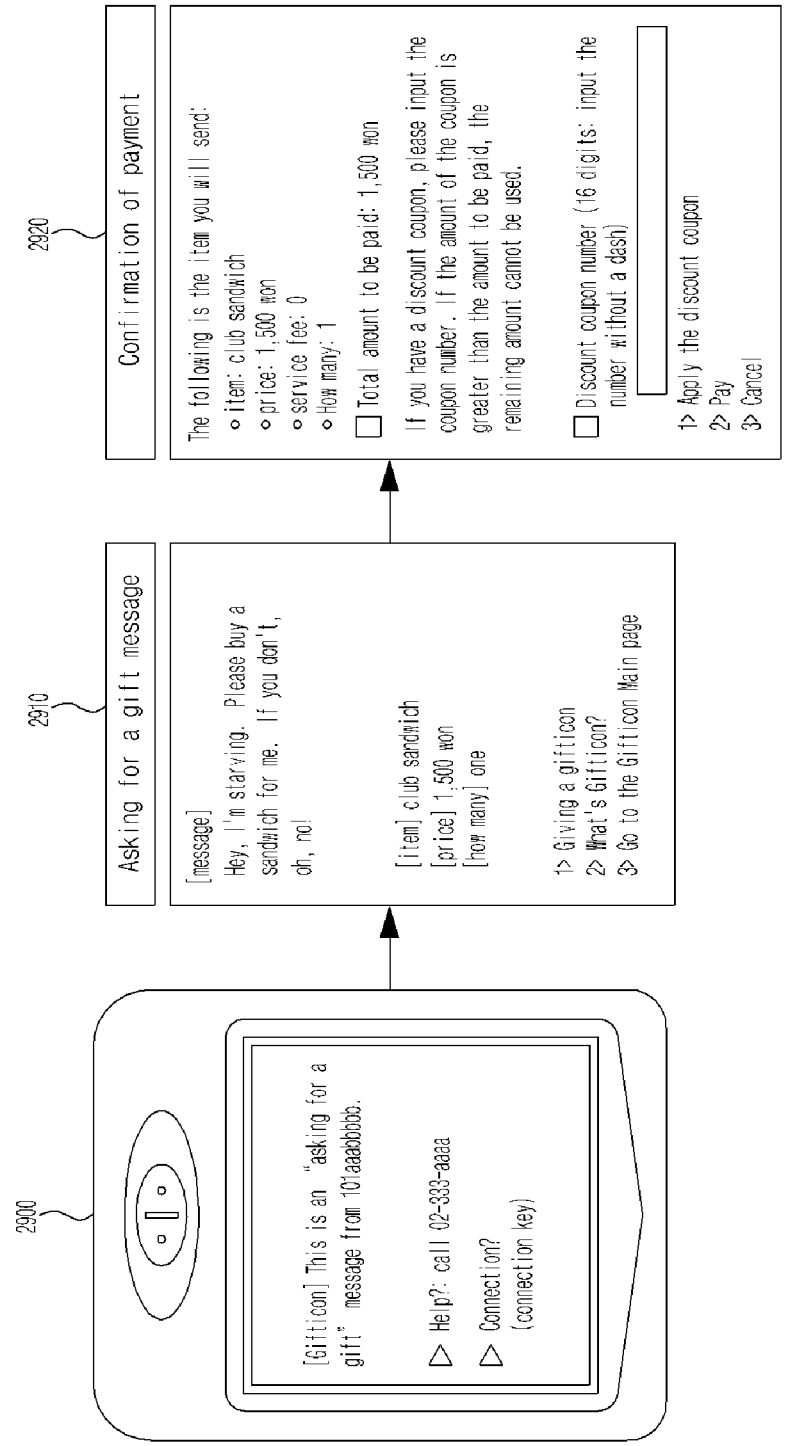
Figure 32:
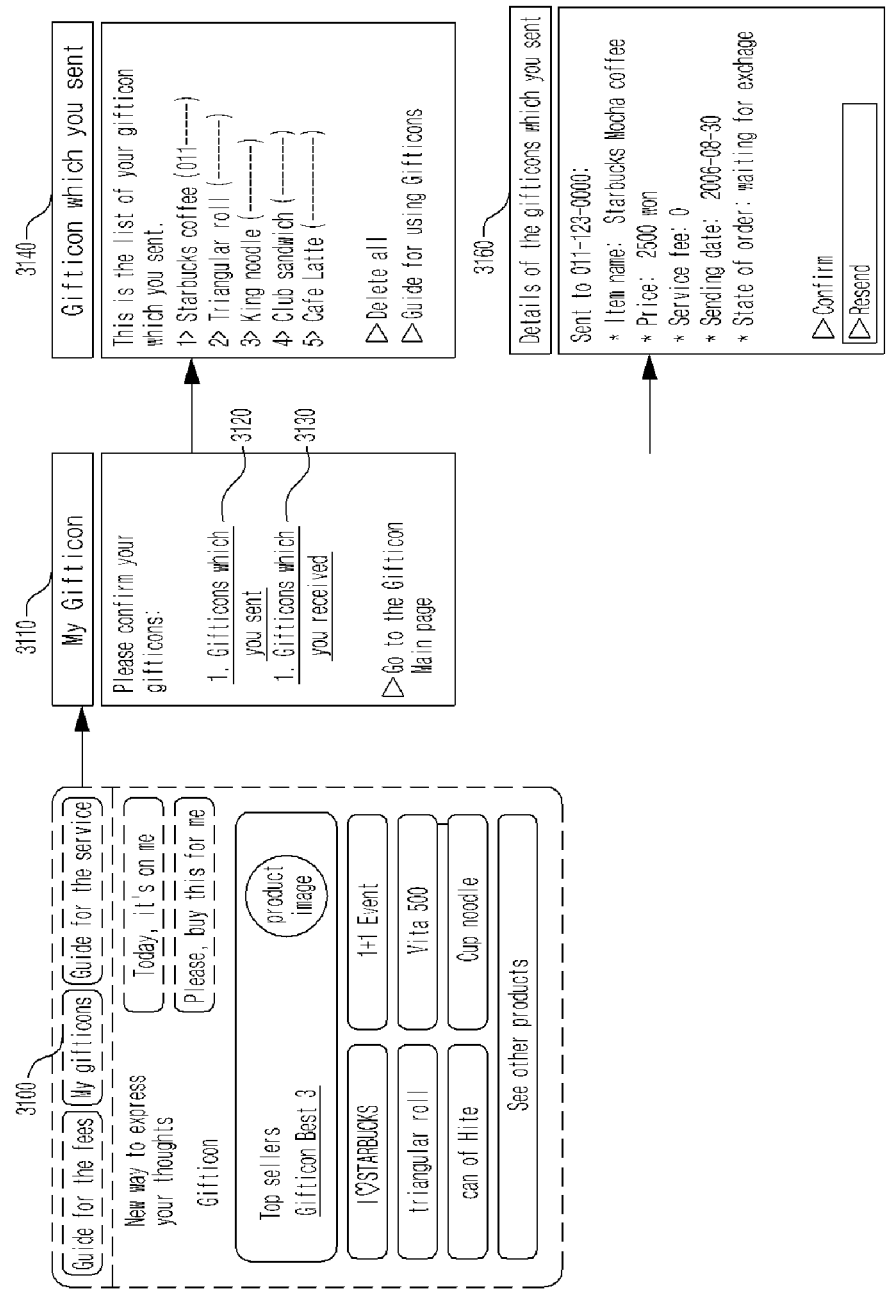

Referring to FIG. 30, if [My gifticon] item 3100 related to the provision, reception and management of the gift icon is selected in a wap page provided when the mobile terminal is connected with the gift provision apparatus 300, a wap page indicated by reference number 3110 is provided, and an item indicated by reference number 3120 is selected when it is desired to see contents of gift icons transmitted by the mobile terminal.

When the [see contents of sent gifticon] item indicated by reference number 3120 is selected, a list indicating which gift icon is transmitted and who had received a gift icon is displayed in the wap page as illustrated in reference numbers 3140 and 3160. In an application example, the list of reference numbers 3140 and 3160 has been stored in the memory of the mobile terminal 130, so that it is possible to read the list.

If the [see contents of received gifticon] item indicated by reference number 3130 is selected, a list of gift icons is displayed as reference icon 3150, and when one of them is selected, detailed information 3155 about the gift icons is provided.

In this case, it is possible to download 3170 one of gift icons according to a user's selection and store it in the memory of the mobile terminal 130. An example of the downloaded gift icon is illustrated in FIG. 28. In an application example, the gift icon has a more-one dimensional bar-code type.

What is claimed is:

1. A method of providing a gift icon through a communication network, the method comprising:
   providing, by a gift provision apparatus, information about at least one product to a user terminal connected with the gift provision apparatus through the communication network;
   detecting, by the gift provision apparatus, a selection signal input at the user terminal, the selection signal including a selected product and a recipient terminal for receiving a gift icon corresponding to the selected product; and providing, by the gift provision apparatus, the gift icon corresponding to the selected product to the recipient terminal through the communication network.

2. The method of claim 1, wherein the gift icon is of a bar-code type.

3. The method of claim 1, further comprising:
receiving, by a user of the recipient terminal, the selected product corresponding to the gift icon.

4. The method of claim 1, wherein the user terminal inputs information of the recipient terminal from an address book including at least one of an e-mail address and a telephone number.

5. The method of claim 1, wherein the user terminal and the recipient terminal are wired terminals or mobile terminals.

6. The method of claim 2, wherein each of the user terminal and the recipient terminal operates a software for transmitting and receiving messages or data in real time through the communication network, and transmits and receives the gift icon through the software.

7. The method of claim 6, further comprising:
when a request message for transmission of the gift icon to a predetermined mobile terminal is transmitted from the recipient terminal, transmitting the gift icon to the predetermined mobile terminal.

8. The method of claim 7, wherein said transmitting the gift icon to the predetermined mobile terminal comprises:
transmitting a message including an unique resource locator (URL) in which the gift icon is stored, to the predetermined mobile terminal.

9. The method of claim 8, wherein said transmitting the gift icon to the predetermined mobile terminal further comprises:
when the predetermined mobile terminal connects to the URL and requests download of the gift icon, downloading the gift icon to the predetermined mobile terminal.

10. The method of claim 1, further comprising:
when the recipient terminal accepts the gift icon, registering, by the gift provision apparatus, an acceptance completion message.

11. The method of claim 1, wherein said providing the gift icon comprises:
providing a web page or a wap page, for a settlement, to the user terminal, and
providing the gift icon when the settlement has been finished through the provided page.

12. The method of claim 1, further comprising:
receiving, by the gift provision apparatus, a request message for the gift icon, and delivering, by the gift provision apparatus, the request message to the recipient terminal;
when an acceptance message is received from the recipient terminal, providing, by the gift provision apparatus, a web page or a wap page for a settlement, to the recipient terminal; and
when the settlement has been finished through the provided page by the recipient terminal, providing, by the gift provision apparatus, the gift icon to the user terminal.

13. The method of claim 1, further comprising:
when the recipient terminal selects a button for returning displayed on a screen of the recipient terminal, providing, by the gift provision apparatus, information about at least one product, and,
when the at least one product is selected,
transmitting, by the gift provision apparatus, the gift icon corresponding to the selected product, to the user terminal.

14. The method of claim 13, further comprising:
when a usable period is set, providing, by the gift provision apparatus, at least one of a first guide message regarding a repayment of money corresponding to the gift icon which is not used for the usable period, and a second guide message regarding a conversion of the gift icon which is not used for the usable period to reserve money, to the user terminal.

15. The method of claim 14, further comprising:
providing, by the gift provision apparatus, contents of gift icons transmitted during a predetermined period, to the user terminal or the recipient terminal.

16. The method of claim 1, further comprising:
authenticating, by the gift provision apparatus, a validity of the gift icon transmitted from a Point Of Sale (POS) terminal installed in a predetermined shop;
transmitting, by the gift provision apparatus, an authentication code corresponding to a completion of the authentication of the validity, to the POS terminal; and
when the selected product corresponding to the gift icon is received by a user of the user terminal, receiving, by the gift provision apparatus, a message indicating receipt completion from the POS terminal.

17. The method of claim 13, further comprising:
providing, by the gift provision apparatus, contents of gift icons transmitted during a predetermined period, to the user terminal or the counterpart terminal.

18. The method of claim 4, wherein the address book includes at least one group consisting at least one of a telephone number and e-mail address of a terminal.

19. The method of claim 1, further comprising:
when the gift icon has been used, receiving, by the gift provision apparatus, a confirmation message confirming the use of the gift icon; and
when the gift provision server receives the confirmation message, prohibiting, by the gift provision apparatus, a further use of the gift icon.

\* \* \* \* \*